United States Patent [19]

Ono

[11] Patent Number: 5,704,015
[45] Date of Patent: Dec. 30, 1997

[54] OPTICAL OPERATION ELEMENT, OPTICAL DATA PROCESSING CIRCUIT AND PHOTOELECTRIC OPERATION ELEMENT

[75] Inventor: Shuji Ono, Kanagawa-ken, Japan

[73] Assignee: Fuji Photo Film Co., Ltd., Kanagawa, Japan

[21] Appl. No.: 138,120

[22] Filed: Oct. 20, 1993

[30] Foreign Application Priority Data

Oct. 20, 1992 [JP] Japan .................................. 4-281597
Oct. 20, 1992 [JP] Japan .................................. 4-281599

[51] Int. Cl.$^6$ ........................................ G06E 3/00
[52] U.S. Cl. ........................ 395/25; 364/713; 359/107; 250/226
[58] Field of Search ...................... 395/25; 364/807, 364/822, 837, 841, 845, 713; 359/107, 237, 248, 245, 259, 298, 315, 316; 250/226, 208.2

[56] References Cited

U.S. PATENT DOCUMENTS

| | | | |
|---|---|---|---|
| 4,039,803 | 8/1977 | Harsch | 219/147 |
| 4,785,180 | 11/1988 | Dietrich et al. | 250/231 R |
| 4,799,768 | 1/1989 | Gahan | 350/279 |
| 4,996,417 | 2/1991 | Shinomiya | 250/226 |
| 5,063,531 | 11/1991 | Kawai et al. | 395/25 |
| 5,095,459 | 3/1992 | Ohta et al. | 395/25 |
| 5,167,007 | 11/1992 | Toyoda | 395/25 |

FOREIGN PATENT DOCUMENTS

| | | | |
|---|---|---|---|
| 0399753 | 11/1990 | European Pat. Off. | G06F 15/80 |
| 0405815 | 1/1991 | European Pat. Off. | G02F 1/135 |

OTHER PUBLICATIONS

Gmitro et al., "Optical Neurocomputer for Implementation of the Marr–Poggio Stereo Algorithm," *IEEE First International Conference on Neural Networks*, pp. III–599–606, Jun. 21, 1987.

Yuk et al., "Optical Neural Networks Based on Error Back–Propagation Learning for Hetro–Association of Two–Dimensional Patterns," *International Journal of Optical Computing*, vol. 2, No. 4, pp. 397–407, Dec. 1991.

Collins et al., "Deformable Mirror Device Spatial Light Modulators and Their Applicability to Optical Neural Networks," *Applied Optics*, vol. 28, No. 22, pp. 4900–4907, Nov. 15, 1989.

(List continued on next page.)

*Primary Examiner*—Robert W. Downs
*Attorney, Agent, or Firm*—Sughrue,Mion,Zinn, Macpeak & Seas, PLLC

[57] ABSTRACT

A modulating optical operation element is composed of a light receiving separation element having a pair of light receiving elements, a photoelectric operation element made of an operation element for calculating electric signals outputted from the light receiving separation element and outputting an electric signal in response to a result of this calculation, a transmission type light modulation element made of a transmission type liquid crystal sandwiched between transparent electrodes, and polarizers disposed on both sides of this light modulation element. An optical neuron yet for outputting an information beam consisting of light outputted from each optical neuron element is constituted by arranging a plurality of these elements a two-dimensional pattern. A constituent unit of an optical neural network is made by the combination of this neuron layer with a weighted information beam output means for weighting a modulated information beam outputted from the neuron layer and outputting the modulated information beam. An optical neural network which acts as optical data processing circuit is constituted by connecting a plurality of these constituent units together.

14 Claims, 21 Drawing Sheets

OTHER PUBLICATIONS

Kiselev et al., "A High–Order Optical Associative Memory Based on Neural Nets," *Telecommunications and Radio Engineering*, vol. 45, No. 11, pp. 127–133, Nov. 1990.

Lee et al., "Optical Inner–Product Implementations for Multi–Layer BAM with 2–Dimensional Patterns," *IEEE International Joint Conference of Neural Networks*, vol. 2, pp. 1729–1734, Nov. 18, 1991.

Neff et al., "Two–Dimensional Spatial Light Modulators: A Tutorial," *Proc. IEEE*, vol. 78, No. 5 (May 1990), pp. 826–855.

S. Lee and Y. Choi, "Robust Recognition of Handwritten Numerals based on Dual Cooperative Network," *Int'l. Joint Conf. Neural Networks* (Jun. 1992), pp. III–760 to III–768.

224a

224b

224c

OPTICAL OPERATION ELEMENT, OPTICAL DATA PROCESSING CIRCUIT AND PHOTOELECTRIC OPERATION ELEMENT

BACKGROUND OF THE INVENTION

1. Field of the Invention

This invention relate to an optical operation element, and more particularly to a modulating optical operation element and an optical operation light emitting element which uses light as a medium transferring data and also an optical data processing circuit using these elements.

Moreover, this invention relates to an optical operation element which converts an entered optical signal into an electric signal, and an operation result is outputted by subjecting this electric signal to an operation.

2. Description of the Prior Art

After the laser was invented in the 1960's, the study of optical data processing which effects the processing of a vast amount of information utilizing the parallel propagation and high speed characteristics of light, for example, image enhancement or image matching has been extensively conducted.

Meanwhile, in recent years, the study of a neural computer which simulates superior data processing functions of live animals has also been prominent. Utilizing a state in which a considerable number of elements, i.e., so-called neurons are combined together this neural network carries out super parallel data processing. The neural computer can be realized as hardware using a dedicated LSI and optical elements.

A neural computer utilizing optical data processing techniques has several advantages. (1) Optical waves are inherently well matched with a neural computer because the optical waves a spatial parallel characteristic. (2) A plurality of neurons are easily interconnected, and it is possibile to vary an interconnection between a considerable number of neurons when a real time hologram or space modulation element is used. (3) Optical waves tray 1 without experiencing cross-talk from each other, and a transmission capacity of the neural computer is large.

The object of an optical neural computer is to realize an intelligent computer which processes, at a super high speed in a super parallel manner, problems which an existing computer poorly solves such as associative processes and pattern recognition.

One example of a basic model of an optical neural computer using such optical data processing unit is shown in FIG. 46, in which the model is made up of a light emitting element array 130 such as an LED (a light emission diode) or LD (laser diode), an optical mask 131 and a light receiving element array 132. Vector data V inputted into the light emitting element array 130 is emitted therefrom in the form of a light intensity. An output (for example, Vj (j=1, 2, ... , N)) from each light emitting element is subjected to wavefront conversion by means of a nonillustrated lens system so that the output can become a sector beam. Only components in a row "j" of the optical mask 131 which correspond to a matrix T are uniformly exposed to the sector beam. Given that the magnitude of a component (i, j) Tij of the matrix T is a light transmissivity, its output intensity is in proportion to Tij×Vj. Light outputted from this optical mask 131 is condensed by means of a lens system, and hence all components in a column "i" are concentrated into one of the light receiving element array 132. Therefore, an output Ui from an i-th light receiving array is defined as equation (1), $$Ui = \sum_{j=1}^{N} TijVj \quad (1)$$

a matrix vector product is obtained at an output of the light receiving element.

The use of the optical technique of this model makes it possible to execute operations at an extremely high speed in a parallel manner. For example, assume that a matrix which has a number of components of $100 \times 100 = 10^4$, and that light emitting elements are actuated at a frequency of 100 MHz, operations are carried out $10^{12}$ times per one second.

As another model, a model using a hologram is also put forward. In a hologram, a photosensitive agent is exposed to light utilizing an interference effect between two coherent optical waves, and the photosensitive agent is fixed, so that a patterned structure with an alternately varied refractive index is produced. Hence, when a plurality of diffraction gratings are defined in one piece of hologram, a model as shown in FIG. 47 can be produced. In this model, an optical beam emitted from one arbitrary point (corresponding to a neuron) on an input surface 133 can be connected to an arbitrary point on an output surface 135. A space resolution of a hologram 134 is 2000 lines/mm or thereabouts, and hence a hologram element measuring 2 cm² possesses independent diffraction gratings more than $10^9$ in principle. This means that a model using a hologram may freely connect an input of more than $10^4$ with an output of more than $10^4$.

Together with an optical interconnection element, an optical threshold element is also put forward. For instance, there is put forward an element utilizing a strong nonlinear optical effect of a medium, that is, a so-called MQW (multiple quantum well) layer which is composed of alternately superimposed ultrathin layers of GaAs and AlGaAs, each having a thickness of, for example, 100 A or thereabouts. Here, a nonlinear optical effect is a phenomenon in which a reflective index varies in response to an input light intensity. It becomes possible to produce an element including this MQW layer sandwiched between two sheets of partial mirrors.

Various attempts have already been made with respect to an optical neural network utilizing optical data processing techniques which use aforementioned model and optical threshold elements. (Ohta and Kuma "Optical Neural Computer" A journal of the Institute of Television Engineers of Japan pp. 931–pp. 936, Vol. 42, No. 9 (1988) and "Optical Neural Computing" Data Processing pp. 984–pp. 992, Vol. 29, No. 9 (1988))

By the way, a phenomenon in which free electrons (photoelectrons) are produced when a material absorbs light or in which the generation of free electrons brings about an increase in electric conductivity or the generation of an electromotive force, namely, a photoelectric effect has heretofore been known.

Various types of photoelectric converting element for converting an optical energy or optical signals into an electric energy or electric signals by the utilization of this photoelectric effect have already been known, and also employed in various applications. For example, a plurality of information beams which differ slightly from each another in wavelength are transferred through an optical fiber, and these beams are separated into each beam on an information-by-information basis. A plurality of information can be transferred, and the processing of each information can be executed by converting each information beam into an electric signal using a photoelectric converting element.

In a neural network of the foregoing model, a connection between neurons is a total coupling in which one neuron is connected to all neurons on a next layer. This makes the number of interconnections between neurons enormous. For instance, an image consisting of 1000×1000 pixels requires as many as $10^{12}$ interconnections. This number cannot be easily achieved even if a coupling method with a large capacity such as a volume hologram is adopted in either the model using the foregoing light receiving elements or the model using the hologram.

Moreover, in a neural network, the weight of each connection between neurons is different. In order to optically realize this, it is necessary to prepare a different connection weight for each neuron. For this reason, the size of the optical mask or the hologram in the aforementioned model is restricted as a result of a diffraction phenomenon, and hence the size of a data processing system using this neural network becomes bulky.

A general optical data processing circuit transfers not only positive numerical signals but also negative numerical signals. The above-mentioned model of an optical neural network, however, enables only positive numerical signals to be transferred. This imposes a significant restriction on information to be processed.

The above-mentioned photoelectric converting element converts each information beam into an electric signal independently of other information beams; outputs the electric signals; and processes the signals by means of a processing system provided separately from a photoelectric operation element. It may be desired that information beams which are relevant to each other be processed simultaneously or that new information should be produced by the combination or the computation of a plurality of information. In such a case, in the foregoing photoelectric converting element, it is necessary that the information beams should be converted into electric signals by means of photoelectric converting elements which are different from each other, and that a plurality of desired signals should be processed, combined or computed after the electric signals have passed through a processing system provided for each electric signal. This causes a processing system using this photoelectric converting element to become bulky and complicated, and also an operation time to be increased.

SUMMARY OF THE INVENTION

In view of the foregoing observations and descriptions, the principle object of this invention is to provide a modulating optical operation element capable of reducing the size of a processing system and also transferring negative numerical signals, an optical operation light emitting element, a constituent unit of an optical data processing circuit utilizing this element, and an optical data processing circuit.

Another object of this invention is to provide a photoelectric operation element and a photoelectric operation element layer which can perform high speed operations without complicating or increasing the size of a processing system.

To these ends, according to first aspect of this invention, the present invention provides a first modulating optical operation element, comprising:

a photoelectric operation element having (a) a plurality of light receiving separation elements which receive and separate a plurality of input information beams (beams carrying information) into individual information beams, and output separated information beams in the form of electric signals independently of each other;

(b) an operation element which outputs a resulting electric signal corresponding to an operation result obtained by subjecting the outputted electric signal to an operation; and a light modulation element which modulates light by changing a transmissivity or a reflection characteristic thereof with respect to light in response to the electric signal, corresponding to the operation result, outputted from the photoelectric operation element.

In this modulating optical operation element, a plurality of, for example, information is formed into beams which are different from each other in wavelength or have different planes of polarization. Also, light receiving separation elements which are different from each other in wavelength sensitivity characteristics or polarization sensitivity characteristics are used. Alternatively, a filter or a filter means such as a polarizing plate may be disposed on the light receiving separation element. Thereby, the plurality of information beams are separated into individual information beams, and hence an electric signal for each information beam can be obtained. In the above aspect, this electric signal is subjected to any specific operation (addition, subtraction, multiplication, non-linear processing, or the like) by means of the operation element, and a resulting electric signal is inputted to the light modulation element, whereby a plurality of operation results can be obtained in the form of dark or bright data.

According to a second aspect of this invention, the present invention provides a second modulating optical operation element as defined by the first modulating optical operation element, wherein the light receiving element is composed of a plurality of filter means arranged adjacently to each other, and the light receiving element receives and separates the plurality of input information beams into individual information beams, and outputs the separated information beams in the form of electric signals independently of each other.

According to a third aspect of this invention, the present invention provides a third modulating optical operation element as defined by either the first or the second modulating optical operation element, wherein the light receiving separation element is composed of a pair of light receiving separation elements arranged adjacently to each other, and the light receiving separation element receives and separates positive and negative information beams (beams carrying positive and negative information) into individual information beams, and outputs the separated information beams in the form of electric signals independently of each other.

Electric signals outputted from the light receiving separation elements and the photoelectric operation element include not only positive and negative electric signals but also an electric signal of zero.

As with the first modulating optical operation element, positive and negative information is formed into beams which are different from each other in wavelength or have different planes of polarization. Also, light receiving separation elements which are different from each other in wavelength sensitivity characteristics or polarization sensitivity characteristics are used. Alternatively, a filter or a filter means such as a polarizing plate may be disposed on the light receiving separation element. Thereby, the positive and negative information beams are separated into individual information beams, and hence electric signals for each of positive and negative information beams can be obtained.

This electric signal is then subjected to an operation (non-linear processing, or the like) by means of the operation element, and a resulting electric signal is inputted to a light modulation element, whereby operation results of the positive and negative information can be obtained in the form of dark and bright data.

According to a fourth aspect of this invention, the present invention provides a first group of modulating optical operation elements comprising:

a plurality of the first, second or third modulating optical operation elements arranged one-dimensionally or two-dimensionally, wherein the first group of modulating optical operation elements outputs data consisting of a beam outputted from each of the modulating optical operation elements.

According to a fifth aspect of this invention, the present invention provides a first constituent unit of an optical data processing circuit comprising:

a first group of modulating optical operation elements according to this invention; and
  a weighted information beam output means which weights a modulated information beam outputted from the first group of modulating optical operation elements, and outputs the weighted information beam.

With such arrangements, when an optical data processing circuit composed of a plurality of these constituent units connected together is constituted, an information beam at one point of a group of modulating optical operation elements can be subjected to real-time data processing without the need for a plurality of interconnections which connect constituent units with each other by means of a local connection which transfers an information beam to the vicinity of a corresponding space light modulation element. Moreover, it is possible to reduce the size of a processing system. This optical data processing circuit is constituted of the foregoing modulating optical operation elements, and hence positive and negative signals can be transferred at the same time, and also these signals can be subjected to processing, whereby it becomes possible to increase the speed of processing.

According to a sixth aspect of this invention, the present invention provides a first optical data processing circuit comprising:

a plurality of first constituent units of an optical data processing circuit according to this invention, wherein the first constituent units are connected to each other in such a manner that an information beam outputted from one constituent unit of the plurality of constituent units enters another constituent unit, one after the other.

According to a seventh aspect of this invention, the present invention provides a second constituent unit of an optical data processing circuit comprising:

a first group of modulating optical operation elements according to this invention;
  a weighted information beam output means which weights a modulated information beam outputted from the first group of modulating optical operation elements, and outputs a weighted information beam;
  another first group of modulating optical operation elements according to this invention, differing from the foregoing first group of modulating optical operation elements, which receives, as an input, the information beam outputted from the weighted information beam output means, and produces an output by modulating the information beam; and
  an information beam re-input means for inputting the modulated information beam outputted from the other first group of modulating optical operation elements to the foregoing first group of modulating optical operation elements again.

When a data processing circuit is built by the combination of a plurality of second constituent units of this optical data processing circuit and a plurality of first constituent units of this invention, it becomes possible to iterate the weighting of an information beam at this constituent unit a required number of times by inputting an information beam outputted from one constituent unit back into the same constituent unit. Therefore, for instance, an inputted information beam can be subjected to coordination processing or contention processing.

According to an eighth aspect of this invention, the present invention provides a second optical data processing circuit comprising:

at least one first constituent unit of an optical data processing circuit according to this invention; and
  at least one second constituent unit of an optical data processing circuit according to this invention, wherein the first constituent unit is connected to the second constituent unit in such a manner that an information beam outputted from one of the constituent units enters another constituent unit, one after the other.

According to a ninth aspect of this invention, the present invention provides a first optical operation light emitting element comprising:

a photoelectric operation element having
    (a) a plurality of light receiving separation elements arranged adjacently to each other which receive and separate a plurality of input information beams into individual information beams, and which output separated information beams in the form of electric signals independently of each other;
    (b) an operation element which outputs a resulting electric signal corresponding to an operation result obtained by subjecting the outputted electric signal to an operation; and
  a light emitting element which emits light at an intensity in response to an electric signal which corresponds to an operation result outputted from the photoelectric operation element.

In this optical operation light emitting element, a plurality of information beams are separated into individual information beams by means of a photoelectric operation element which is identical with the modulating optical operation element according to this invention, whereupon an electric signal of each information is obtained. This electric signal is then computed, and a resulting electric signal is outputted. The light emitting element emits light in response to this electric signal. Accordingly, it is possible to obtain operation results of the plurality of information items in the form of bright and dark light without light inputted from the outside to read information.

According to a tenth aspect of this invention, the present invention provides a second optical operation light emitting element, comprising a light receiving element composed of a plurality of filter means arranged adjacently to each other, wherein the light receiving element receives and separates a plurality of input information beams into individual information beams, and outputs the separated information beams in the form of electric signals independently of each other.

According to an eleventh aspect of this invention, the present invention provides a third optical operation light emitting element comprising a light receiving separation element which receives and separates input positive and negative information beams into individual information beams, and outputs the separated information beams in the form of electric signals independently of each other.

As with the first optical operation light emitting element, positive and negative information is formed into beams which are different from each other in wavelength or have different planes of polarization. Also, light receiving separation elements which are different from each other in wavelength sensitivity characteristics or polarization sensitivity characteristics are used. Alternatively, a filter or a filter means such as a polarizing plate may be disposed on the light receiving separation element. Thereby, the positive and negative information beams are separated into individual information beams, and hence electric signals for each of the positive and negative information beams can be obtained. This electric signal is then subjected to an operation (non-linear processing, or the like) by means of the operation element, and the light emitting element is arranged to emit light in response to this operation result. Thereby, it becomes possible to obtain operation results of the positive and negative information in the form of dark and bright data without light inputted from the outside to read information.

According to a twelfth aspect of this invention, the present invention provides a fourth optical operation light emitting element defined by any one of the first, second and third optical operation light emitting elements of this invention, further comprising a weighting means for weighting a beam outputted from the light emitting element.

Thus, since the weighting means is incorporated into the element, it is possible to emit weighted optical information without disposing a weighting means outside the element.

According to a thirteenth aspect of this invention, the present invention provides a fifth optical operation light emitting element as defined by any one of the first, second and third optical operation light emitting elements of this invention, wherein the light receiving separation element can receive two information beams from two different directions. Thus, two types of signals which are inputted separately from each other can be respectively processed.

According to a fourteenth aspect of this invention, the present invention provides a sixth optical operation light emitting element defined by the fourth optical operation light emitting element of this invention, wherein the light receiving separation element can receive two information beams from two different directions.

According to a fifteenth aspect of this invention, the present invention provides a first group of optical operation light emitting elements comprising:

a plurality of the first, second or third optical operation light emitting elements, according to this invention, arranged one-dimensionally or two-dimensionally, whereby the first group outputs an information beam composed of the combination of beams outputted from the optical operation light emitting elements.

According to a sixteenth aspect of this invention, the present invention provides a third constituent unit of an optical data processing circuit comprising:

a first group of optical operation light emitting elements according to this invention; and a weighted information beam output means which weights information beams outputted from the group of optical operation light emitting elements, and outputs a weighted information beam.

When an optical data processing circuit is built by connecting a plurality of these constituent units together, data processing similar to that of the first optical data processing circuit of this invention can be exercised without light inputted from the outside to read information.

In addition, as with the second constituent unit of an optical data processing circuit according to this invention, when an optical data processing circuit is constituted of fourth constituent units of an optical data processing circuit, according to this invention, and an information beam re-input means, it is possible to iterate the weighting of an information beam required times. Hence, it becomes possible to subject an input information beam to coordination or contention processing.

According to a seventeenth aspect of this invention, the present invention provides a third optical data processing circuit comprising:

a plurality of third constituent units of an optical data processing circuit according to this invention, wherein the plurality of third constituent units are connected to each other in such a manner that an information beam outputted from one of the constituent units enters another constituent unit, one after the other.

According to an eighteenth aspect of this invention, the present invention provides a fourth constituent unit of an optical data processing circuit comprising:

a first group of optical operation light emitting elements according to this invention;

a weighted information beam output means which weights a modulated information beam outputted from the first group of modulating optical operation elements, and produces an output by modulating the information beam;

another first group of optical operation light emitting elements according to this invention, differing from the foregoing first group of optical operation light emitting elements, which receives, as an input, the information beam outputted from the weighted information beam output means, and outputs a modulated information beam; and an information beam re-input means for inputting the modulated information beam outputted from the other first group of optical operation light emitting elements to the foregoing first group of optical operation light emitting elements again.

According to a nineteenth aspect of this invention, the present invention provides a fourth optical data processing circuit comprising:

at least one third constituent unit of an optical data processing circuit according to this invention; and at least one fourth constituent unit of an optical data processing circuit according to this invention, wherein the third constituent unit is connected to the fourth constituent unit in such a manner that an information beam outputted from one of the constituent units enters another constituent unit, one after the other.

According to a twentieth aspect of this invention, the present invention provides a fifth constituent unit of an optical data processing circuit comprising:

a plurality of fourth optical operation light emitting elements, according to this invention, arranged one-dimensionally or two-dimensionally, whereby the fifth unit outputs an information beam composed of the combination of beams outputted from the optical operation light emitting elements.

According to a twenty-first aspect of this invention, the present invention provides a fifth optical data processing circuit comprising:

a plurality of fifth constituent units of an optical data processing circuit according to this invention, wherein the plurality of fifth constituent units are connected to each other in such a manner that an information beam outputted from one of the constituent units enters another constituent unit, one after the other.

As with the fourth optical data processing circuit of this invention, the fifth optical data processing circuit can perform data processing similar to that of the first optical data processing circuit without light inputted from the outside to read information. Moreover, the fourth optical operation light emitting element is provided with a weighting means, and hence there is no need for a weighting output means to be disposed between constituent units, whereby it is possible to constitute a significantly small-sized optical data processing circuit.

Furthermore, when an optical data processing circuit is constituted of fifth constituent units of an optical data processing circuit, according to this invention, and an information beam re-input means, it is possible to iterate the weighting of an information beam a necessary number of times. Hence, it becomes possible to subject an input information beam to coordination or contention processing.

The fifth and sixth optical operation light emitting elements are intended to iterate weighting a necessary number of times. A constituent unit of an optical data processing circuit can be constituted by one-dimensionally or two-dimensionally arranging a plurality of these fifth and sixth optical operation light emitting elements and,in the case of the fifth optical operation light emitting element, by providing a weighting means. An optical data processing circuit can be constituted by connecting a plurality of these constituent units of an optical data processing circuit together. This optical data processing circuit is further provided with an information beam re-input means for inputting an information beam outputted from each constituent unit of the optical data processing circuit to this constituent unit again so that the information beam weighted by this constituent unit can enter this constituent unit again from a direction different from the direction in which the information beam has been inputted to this constituent unit from a prior stage. Thereby, it becomes possible to constitute a smaller optical data processing circuit which is intended to iterate a weighting operation.

According to a twenty-second aspect of this invention, the present invention provides a second group of optical operation light emitting elements comprising:

a plurality of fifth optical operation light emitting elements, according to this invention, arranged one-dimensionally or two-dimensionally, whereby the second group outputs an information beam composed of the combination of beams outputted from the optical operation light emitting elements.

According to a twenty-third aspect of this invention, the present invention provides a sixth constituent unit of an optical data processing circuit comprising:

a second group of optical operation light emitting elements according to this invention; and a weighted information beam output means which weights an modulated information beam outputted from the second group of modulating optical operation elements, and outputs a weighted information beam.

According to a twenty-fourth aspect of this invention, the present invention provides a sixth optical data processing circuit comprising:

a plurality of sixth constituent units of an optical data processing circuit according to this invention, wherein the plurality of sixth constituent units are connected to each other in such a manner that an information beam outputted from one of the constituent unit enters another constituent unit, one after the other.

According to a twenty-fifth aspect of this invention, the present invention provides a seventh constituent unit of an optical data processing circuit comprising:

a sixth constituent unit of an optical data processing circuit according to this invention; and an information beam re-input means for inputting an information beam outputted from the sixth constituent unit to the sixth constituent unit again.

According to a twenty-sixth aspect of this invention, the present invention provides a seventh optical data processing circuit comprising:

at least any one of the first, second, third and fifth constituent units of an optical data processing circuit according to this invention; and at least one seventh constituent unit of an optical data processing circuit according to this invention, wherein the constituent units are connected to each other in such a manner that an information beam outputted from one of the constituent units enters another constituent unit, one after the other.

According to a twenty-seventh aspect of this invention, the present invention provides an eighth constituent unit of an optical data processing circuit comprising:

a plurality of sixth optical operation light emitting elements, according to this invention, arranged one-dimensionally or two-dimensionally, whereby the eighth constituent unit outputs an information beam composed of the combination of beams outputted from the optical operation light emitting elements.

According to a twenty-eighth aspect of this invention, the present invention provides an eighth optical data processing circuit comprising:

a plurality of eighth constituent units of an optical data processing circuit according to this invention, wherein the plurality of eighth constituent units are connected to each other in such a manner that an information beam outputted from one of the constituent units enters another constituent unit, one after the other.

According to a twenty-ninth aspect of this invention, the present invention provides a ninth constituent unit of an optical data processing circuit comprising:

an eighth constituent unit of an optical data processing circuit according to this invention; and an information beam re-input means for inputting an information beam outputted from the eighth constituent unit to the eighth constituent unit again.

According to a thirtieth aspect of this invention, the present invention provides a ninth optical data processing circuit comprising:

at least any one of the first, second, third and fifth constituent units of an optical data processing circuit according to this invention; and at least one ninth constituent unit of an optical data processing circuit according to this invention, wherein the constituent units are connected to each other in such a manner that an information beam outputted from one of the constituent units enters another constituent unit, one after the other.

According to a thirty-first aspect of this invention, the present invention provides a tenth constituent unit of an optical data processing circuit comprising:

a plurality of fourth optical operation light emitting elements arranged cylindrically or spherically, whereby the tenth constituent unit outputs an information beam composed of the combination of beams outputted from the optical operation light emitting elements.

According to a thirty-second aspect of this invention, the present invention provides a tenth optical data processing circuit comprising:

a plurality of tenth constituent units of an optical data processing circuit, wherein the constituent units are connected to each other in such a manner that an information beam outputted from one of the constituent units enters another constituent unit, one after the other.

According to a thirty-third aspect of this invention, the present invention provides an eleventh constituent unit of an optical data processing circuit comprising:

a plurality of sixth optical operation light emitting elements arranged cylindrically or spherically, whereby the eleventh constituent unit outputs an information beam composed of the combination of beams outputted from the optical operation light emitting elements.

The tenth and eleventh optical data processing circuits are arranged by connecting a plurality of these tenth and eleventh constituent units of an optical data processing circuit together in such a manner that an information beam outputted from one constituent unit enters another constituent unit, one after the other. This makes it possible to transfer not only information beams on a two dimensional plane in a real space but also information beams subjected to the transformation of a polar-coordinate system, and hence it is possible to execute the data processing of a polar-coordinate system.

According to a thirty-fourth aspect of this invention, the present invention provides an eleventh optical data processing circuit comprising:

a plurality of eleventh constituent units of an optical data processing circuit, wherein the constituent units are connected to each other in such a manner that an information beam outputted from one of the constituent units enters another constituent unit, one after the other.

According to a thirty-fifth aspect of this invention, the present invention provides a twelfth constituent unit of an optical data processing circuit comprising:

an eleventh constituent unit of an optical data processing circuit according to this invention; and an information beam re-input means for inputting an information beam outputted from the eleventh constituent unit to the eleventh constituent unit again.

According to a thirty-sixth aspect of this invention, the present invention provides a twelfth optical data processing circuit comprising:

at least any one of the tenth and eleventh constituent units of an optical data processing circuit according to this invention; and at least one twelfth constituent unit of an optical data processing circuit according to this invention, wherein the constituent units are connected to each other in such a manner that an information beam outputted from one of the constituent units enters another constituent unit, one after the other.

Thus, when an optical data processing circuit is constituted of eleventh constituent units of an optical data processing circuit, according to this invention, and an information beam re-input means, it is possible to iterate weighting a necessary number of times. Hence, it becomes possible to subject an input information beam to coordination or contention processing.

According to a thirty-seventh aspect of this invention, the present invention provides optical data optical data processing circuit comprising:

at least any one of the first, second, third, fifth, tenth and eleventh constituent units of an optical data processing circuit according to this invention; and at least one constituent unit of ninth and twelfth constituent units of an optical data processing circuit according to this invention, wherein the constituent units are connected to each other in such a manner that an information beam outputted from one of the constituent units enters another constituent unit, one after the other.

When the first, second, third, fifth, tenth and eleventh constituent units of an optical data processing circuit are combined together, it becomes possible to process information beams in a real space and information beams in a polar-coordinate system in combination.

According to a thirty-eighth aspect of this invention, the present invention provides a first photoelectric operation element which converts an inputted optical signal into an electric signal, and produces an output by subjecting the electric signal to an operation, the first photoelectric operation element comprising:

a plurality of light receiving separation elements which receive and separate a plurality of input information beams (beams carrying information) into individual information beams, and output separated information beams in the form of electric signals independently of each other; and an operation element which outputs an electric signal in response to an operation result obtained by subjecting to an operation the electric signal outputted from the light receiving separation element.

This first optical operation element produces an electric signal of each information by forming a plurality of information items into, for example, beams which are different from each other in wavelength, and receiving and separating the information beams containing a plurality of information items into individual information beams with the use of a plurality of light receiving elements which are different from each other in polarization sensitivity characteristic. This electric signal is then subjected to an operation (addition, subtraction, multiplication, non-linear processing, or the like) by means of the operation element, and an operation result can be obtained in the form of an electric signal. This avoids the use of a processing system, disposed independently of the element, for executing the processing of this electric signal, and hence it becomes possible for one element to execute the separation of information beams and operation thereof at the same time.

According to a thirty-ninth aspect of this invention, the present invention provides a first photoelectric operation element layer comprising:

a plurality of first photoelectric operation elements, according to this invention, arranged one-dimensionally or two-dimensionally.

According to a fortieth aspect of this invention, the present invention provides a second photoelectric operation element which converts an inputted optical signal into an electric signal, and produces an output by subjecting the electric signal to an operation, the second photoelectric operation element comprising:

a light receiving separation element composed of a plurality of filter means arranged adjacently to each other, for receiving and separating a plurality of input information beams into individual information beams, and outputting separated information beams in the form of electric signals independently of each other; and an operation element which outputs an electric signal corresponding to an operation result obtained by subjecting the electric signal outputted from the light receiving separation element to an operation.

A plurality of, for example, information is formed into beams which are different from each other in wavelength or have different planes of polarization. A filter or a filter means such as a polarizing plate is disposed on the light receiving separation element. Thereby, the plurality of information beams are separated into individual information beams, and a plurality of information beams thus separated are received by a plurality of light receiving elements, whereby an electric signal of each item of information is obtained. This electric signal is then subjected to an operation (addition, subtraction, multiplication, non-linear processing, or the like) by means of the operation element, and an operation result can be obtained in the form of an electric signal. This avoids the use of a processing system, provided independently of the element, for executing the processing of this electric signal, and hence it becomes possible for one element to execute the separation of information beams and operation thereof at the same time.

According to a forty-first aspect of this invention, the present invention provides a second photoelectric operation element layer comprising:

a plurality of second photoelectric operation elements, according to this invention, arranged one-dimensionally or two-dimensionally.

According to a forty-second aspect of this invention, the present invention provides a third photoelectric operation element which converts an inputted optical signal into an electric signal, and produces an output by subjecting the electric signal to an operation, the third photoelectric operation element comprising:

a pair of light receiving separation elements, arranged adjacently to each other, for receiving and separating positive and negative input information beams (beams carrying positive and negative information) into individual information beams, and outputting separated information beams in the form of electric signals independently of each other; and an operation element which outputs an electric signal corresponding to an operation result obtained by subjecting the electric signal outputted from each of the light receiving separation elements to an operation.

As with, for example, the first photoelectric operation element of this invention, positive and negative information is formed into beams which are different from each other in wavelength. The positive and negative information beams are separated into individual information beams by the use of a pair of light receiving elements which are different from each other in polarization sensitivity characteristic, so that an electric signal for each of positive and negative information is obtained. This electric signal is then computed by means of the operation element, and an operation result can be obtained in the form of an electric signal. This avoids the use of a processing system, which is provided independently of the element, for executing the processing of this electric signal, and hence it becomes possible for one element to execute the separation of information beams and operation thereof at the same time.

According to a forty-third aspect of this invention, the present invention provides a third photoelectric operation element layer comprising:

a plurality of third photoelectric operation elements, according to this invention, arranged one-dimensionally or two-dimensionally.

According to a forty-fourth aspect of this invention, the present invention provides a fourth photoelectric operation element which converts an inputted optical signal into an electric signals, and produces an output by subjecting the electric signal to an operation, the fourth photoelectric operation element comprising:

a light receiving separation element, composed of a pair of filter means arranged adjacently to each other, for receiving and separating positive and negative input information beams into individual information beams, and outputting separated information beams in the form of electric signals independently of each other; and an operation element which outputs an electric signal corresponding to an operation result obtained by subjecting the electric signal outputted from the light receiving separation elements to an operation.

As with, for example, the second photoelectric operation element of this invention, positive and negative information is formed into beams which are different from each other in wavelength or have different planes of polarization. The positive and negative information beams are separated into individual information beams when a filter or a filter means such as a polarizing plate is disposed on the light receiving separation element, so that an electric signal for each of positive and negative information is obtained. This electric signal is then computed by means of the operation element, and an operation result can be obtained in the form of an electric signal. This avoids the use of a processing system, which is provided independently of the element, for executing the processing of this electric signal, and hence it becomes possible for one element to execute the separation of information beams and operation thereof at the same time.

According to a forty-fifth aspect of this invention, the present invention provides a fourth photoelectric operation element layer comprising:

a plurality of fourth photoelectric operation elements, according to this invention, arranged one-dimensionally or two-dimensionally.

As has been described in detail, since the modulating optical operation element and the optical operation light emitting element, according to this invention, can transfer operation results of a plurality of information beams (beams carrying information) in the form of dark and bright data, it becomes unnecessary to carry out operations on an information-by-information basis, which in turn enables information beams to be processed at high speed.

Moreover, since the constituent unit of an optical data processing circuit and the optical data processing circuit, according to this invention, can transfer and process positive and negative information beams (beams carrying positive and negative information) at one time, it is possible to perform parallel operations with a high degree of parallelism. As a result of this, it becomes possible to process a massive amount of information without increasing a processing time. Also, the use of the parallel propagation characteristic of light in transferring signals allows a large amount of information beams to be transferred in a space of a limited size, whereby a compact neural network can be constituted. Furthermore, the use of an information beam re-input means enables the weighting of an information beam to be iterated, whereby it is possible to subject the information beam to coordination or contention operation.

In the optical operation light emitting element provided with light emitting elements, when this optical operation light emitting element is provided with a weighting mask, it becomes possible for one element to carry out both modulation and weighting at one time. This avoids the use of a weighting output means disposed between a group of optical operation light emitting elements composed of these optical operation light emitting elements, and hence a smaller optical data processing circuit can be constituted.

The utilization of integration techniques for an LSI makes it possible to constitute on one substrate both of an optical operation light emitting element provided with these light emitting elements and a weighting mask attached to the optical operation light emitting element. In such an integrated optical operation light emitting chip, it becomes unnecessary to carry out positional adjustments of the group of optical operation light emitting elements. Therefore, it is possible to constitute a much smaller optical data processing circuit which withstands disturbances.

In the photoelectric operation element, according to this invention, one element carries out the separation of a plurality of information beams and the processing of these separated information beams, and produces results of the operation in the form of electric signals. This avoids the use of a processing system, disposed independently of this element, for performing operation, and hence a processing system which employs this photoelectric operation element can be reduced in size and simplified.

Since it is not necessary to perform operations for each information beam, and since one element can execute both the reception and processing of beams, it is possible to process information beams at high speed.

It is also possible to subject inputted information beams to any processing such as a logical operation and non-linear processing.

DESCRIPTION OF THE PREFERRED EMBODIMENTS

With reference to the accompanying drawings, preferred embodiments of this invention will now be described in detail hereinbelow.

An explanation will be initially given of embodiments of a modulating optical operation element.

First Embodiment of Modulating Optical Operation Element

Figure 1:
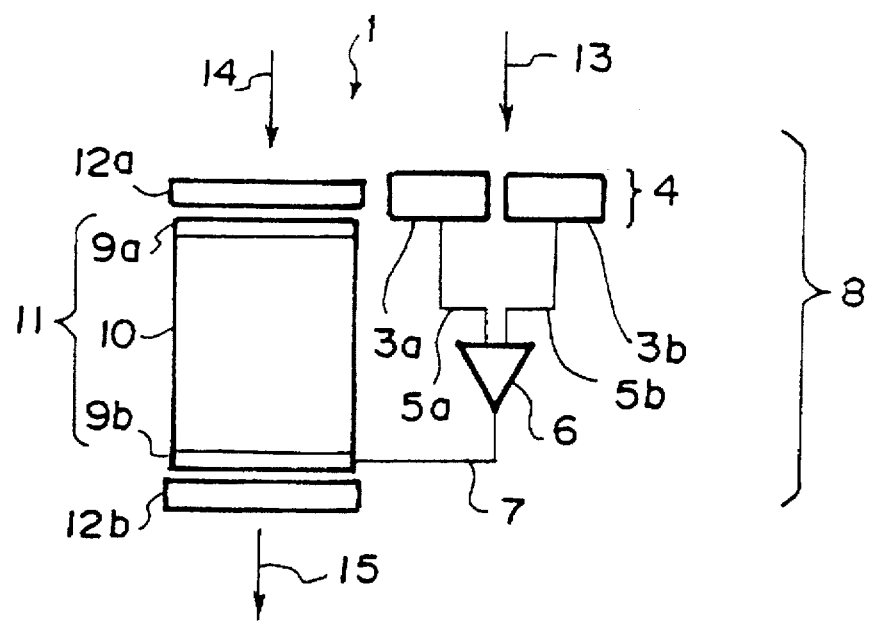
FIG. 1 shows an optical neuron element according to a first embodiment of a modulating optical operation element of this invention.

FIG. 1 shows the structure of an optical neuron element according to a first embodiment of a modulating optical operation element of this invention. As illustrated in FIG. 1, an optical neuron element 1 is made up of:

a light receiving separation element 4 containing
a light receiving element 3a, made of a photodiode having a sensitivity characteristic relative to red, for producing an output in the form of an electric signal 5a upon receipt of a positive information beam having a red wavelength and a light receiving element 3b, made of a photodiode having a sensitivity characteristic relative to blue, for producing an output in the form of an electric signal 5b upon receipt of a negative information beam having a blue wavelength;

a photoelectric operation element 8 made of an operation element 6 for outputting an electric signal 7 corresponding to a result of the operation of the electric signals 5a and 5b outputted from the light separation element 4;

a transmission type light modulation element 11 made of a transmission type liquid crystal 10 sandwiched between transparent electrodes 9a and 9b; and polarizers 12a and 12b with the light modulation element 11 interposed therebetween.

When the optical neuron element 1 is simultaneously exposed to blue light representing positive information and red light representing negative information of an information beam 13, the positive and negative information beams are separated from each other by means of the light receiving elements 3a and 3b, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, whereby an electric signal 7 corresponding to the result of this operation is outputted. The light modulation element 11 is modulated in response to this electric signal 7. When the light modulation element 11 thus modulated is exposed to a read beam 14 such as white light, the read beam 14 is polarized by means of the polarizer 12a. The polarized read beam 14 is subjected to transmission modulation by the light modulation element 11, and is outputted in the form of an information beam 15 after having been polarized by the polarizer 12b.

Second Embodiment of Modulating Optical Operation Element

Figure 2:
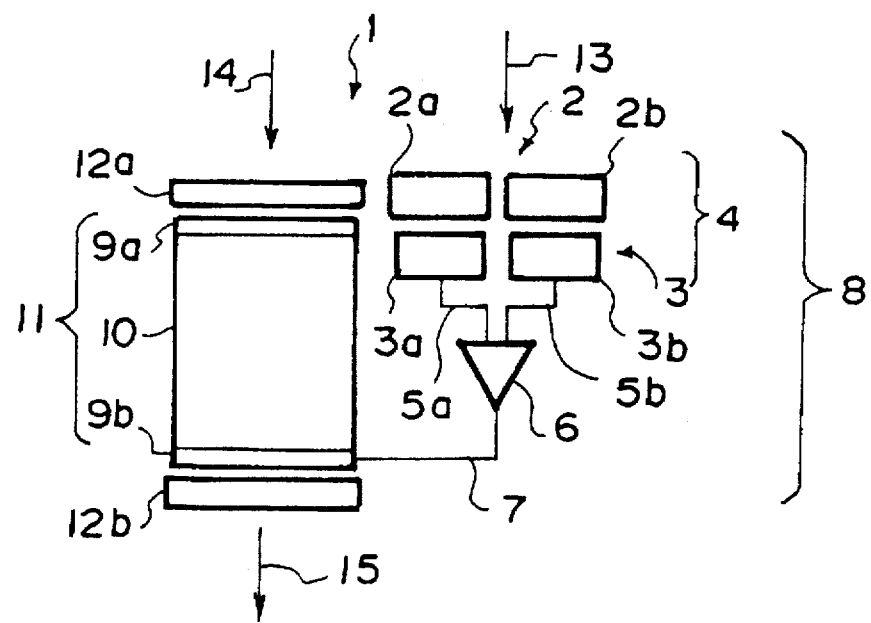
FIG. 2 shows an optical neuron element according to a second embodiment of a modulating optical operation element of this invention.

FIG. 2 shows the structure of an optical neuron element according to a second embodiment of a modulating optical operation element of this invention. As illustrated in FIG. 2, an optical neuron element 1 is made up of:

a light receiving separation element 4 containing
a positive and negative signal separation filter 2 in which a blue filter 2a and a red filter 2b are arranged adjacently to each other and a pair of light receiving elements 3, that is, a light receiving element 3a made of a photodiode for producing an output in the form of an electric signal 5a upon receipt of an information beam filtered by the blue filter 2a, and a light receiving element 3b made of a photodiode for producing an output in the form of an electric signal 5b upon receipt of an information beam filtered by the red filter 2b;

a photoelectric operation element 8 made of an operation element 6 for outputting an electric signal 7 corresponding to a result of the operation of the electric signals 5a and 5b outputted from this light separation element 4;

a transmission type light modulation element 11 made of a transmission type liquid crystal 10 sandwiched between transparent electrodes 9a and 9b; and polarizers 12a and 12b with the light modulation element 11 interposed therebetween.

When the optical neuron element 1 is concurrently exposed to both blue light representing positive information and red light representing negative information of an information beam 13, the positive and negative information beams are separated from each other by means of the light receiving elements 3a and 3b, whereupon the information is outputted in the form of an electric signal 5a representing positive information and an electric signal 5b representing negative information, respectively. The outputted electric signals 5a and 5b are subjected to addition, subtraction or a non-linear processing by means of the operation element 6, whereby an electric signal 7 corresponding to the result of this operation is outputted. The light modulation element 11 is modulated in response to this electric signal 7. When the light modulation element 11 thus modulated is exposed to a read beam 14 such as white light, the read beam 14 is polarized by means of the polarizer 12a. The polarized read beam 14 is subjected to a transmission modulation by the light modulation element 11, and is outputted in the form of an information beam 15 after having been polarized by the polarizer 12b.

An optical neuron layer for outputting an information beam made of light outputted from each optical neuron element is constituted by arranging a plurality of the optical neuron elements 1, according to either the first or the second embodiment, having such a function in a one-dimensional or a two-dimensional shape. A constituent unit of an optical neural network is constituted of the optical neuron layer and a weighted information beam output means for outputting a weighted information beam by weighting a modulated information beam outputted from the optical neuron layer. An optical neural network can be constituted by the connection of a plurality of these constituent units of an optical neural network.

Figure 3:
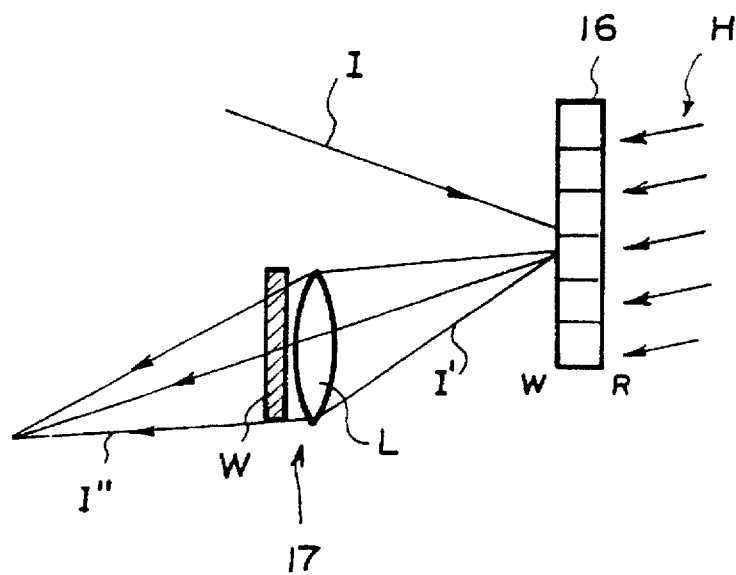
FIG. 3 shows a constituent unit of an optical neural network using optical neuron elements according to either a first or a second embodiment of a modulating optical operation element of this invention.

FIG. 3 shows one embodiment of a constituent unit of an optical neural network, serving as an optical data processing circuit, which is constituted of the optical neuron elements according to either the first or the second embodiment of a modulating optical operation element of this invention.

As illustrated in FIG. 3, the constituent unit of an optical neural network constituted of the optical neuron elements, according to either the first or the second embodiment, comprises an optical neuron layer 16 made by the connection of a plurality of the foregoing optical neuron elements 1 arranged two-dimensionally and a weighting output means 17 composed of a weighting mask W and a lens L. The optical neuron layer 16 is arranged with its light receiving and separation elements facing to the left in the drawing. The W side of the optical neuron layer 16 is exposed to an information beam I in which positive information is represented by blue light and negative information is represented by red light. The irradiated information beam I is then subjected to the foregoing operation by means of each of the optical neuron elements which constitute the optical neuron layer 16. A light modulation element in each optical neuron element is modulated in response to the information beam inputted to each optical neuron element. Thereafter, the R side of the optical neuron layer 16 is exposed to a read/write beam H such as white light. The irradiated read/write beam H is modulated by the light modulation element of each optical neuron element which constitutes the optical neuron layer 16, and then outputted as an information beam I'. The outputted information beam I' passes through the lens L, and is weighted by the mask W. A resulting beam is then outputted as a weighted information beam I''. The weighting mask W is composed of a blue filter and a red filter so that it can effect desired weighting.

Figure 4:
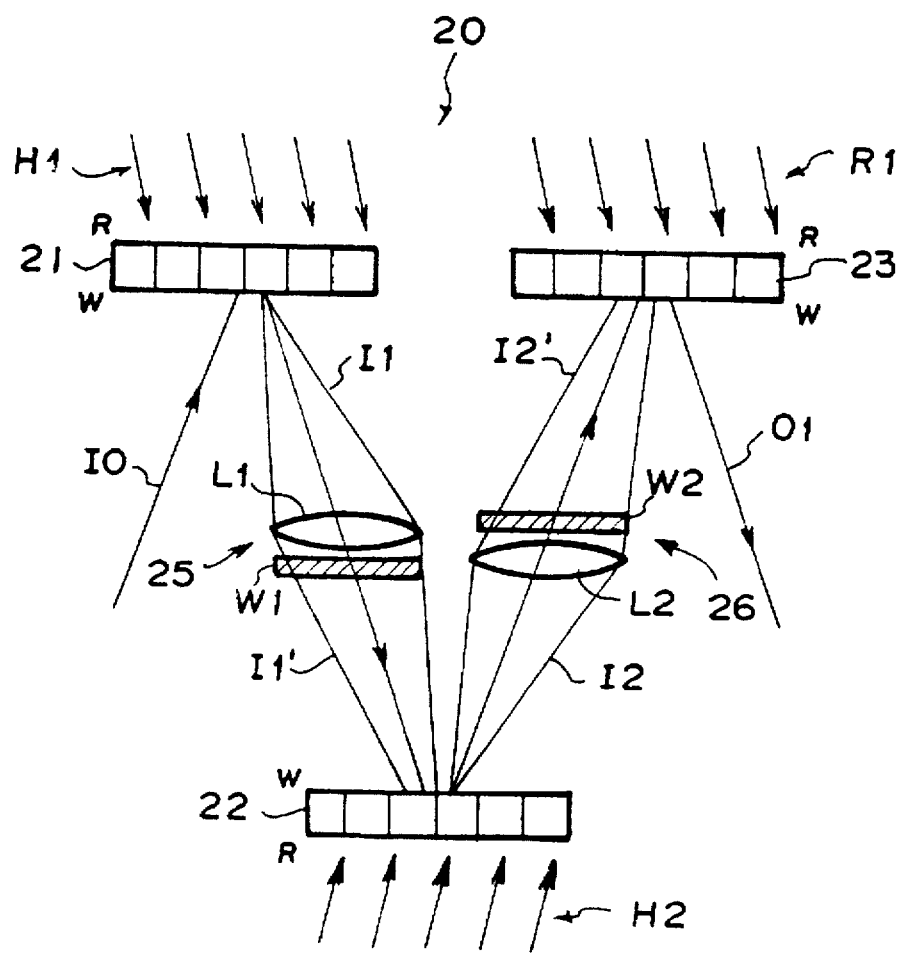
FIG. 4 shows an optical neural network constituted by the connection of a plurality of constituent units of an optical neural network using optical neuron elements according to either a first or a second embodiment of a modulating optical operation element of this invention.

FIG. 4 shows an optical neural network constituted by the connection of a plurality of such constituent units of an optical neural network.

As illustrated in FIG. 4, in an optical neural network 20, two constituent units are connected together so that they are facing opposite to each other. An information beam is weighted by a weighting means of each constituent unit, and this weighted information beam is transferred to another constituent unit on the next stage. With such an arrangement in which the constituent units are arranged opposite to each other, it is possible to constitute a compact neural network, and also improve the accuracy of the arrangement of the constituent units.

An information beam IO is inputted into the W side of an optical neuron layer 21 of a constituent unit of a first optical neural network. A light modulation element of each optical neuron element in the optical neuron layer 21 is modulated in response to this information beam IO. The R side of the optical neuron layer 21 is then exposed to a read/write beam H1, and the read/write beam H1 is modulated in response to an information beam recorded in the optical neuron layer 21, and an information beam is eventually outputted. This outputted information beam I1 is weighted by means of a weighting means 25 composed of an lens L1 and a weighting mask W1. This weighted information beam I1' is inputted into the W side of an optical neuron layer 22 of a constituent unit of a second neural network. In response to this information beam I1', a light modulation element of each optical neuron element in the optical neuron layer 22 is modulated. At this time, the transfer of an information beam from one optical neuron element of the optical neuron layer 21 to the optical neuron layer 22 is a locally coupled type transfer. In this locally coupled type transfer, an information beam is only transferred to an optical neuron element in the vicinity of one optical neuron element on the optical neuron layer 22 which corresponds to one optical neuron element on the optical neuron layer 21. Likewise in the optical neuron layer 21, the R side of the optical neuron layer 22 is exposed to a read/write beam H2, and the read/write beam H2 is modulated in response to an information beam recorded in the optical neuron layer 22, and an information beam is eventually outputted. This outputted information beam I2 is subjected to a weighting which is different from the weighting mask W1 by means of a weighting means 26 composed of a lens L2 and a weighting mask W2, and then reflected. This weighted information beam I2' is inputted into an output optical neuron layer 23. As mentioned above, a light modulation element of each optical neuron element is modulated in response to this information beam I2'. The information beam I2' recorded in this optical neuron layer 23 is read when the R side of the optical neuron layer 23 is exposed to a read beam R1, and a processed information beam O1 is eventually outputted.

In this neural network 20, each optical neuron layer constitutes one neuron layer, and a common weight of connection is used for any point of each layer. In other words, the neural network is in a space invariant state. Hence, it is possible to realize a weighted connection between layers.

Third Embodiment of Modulating Optical Operation Element

Figure 5:
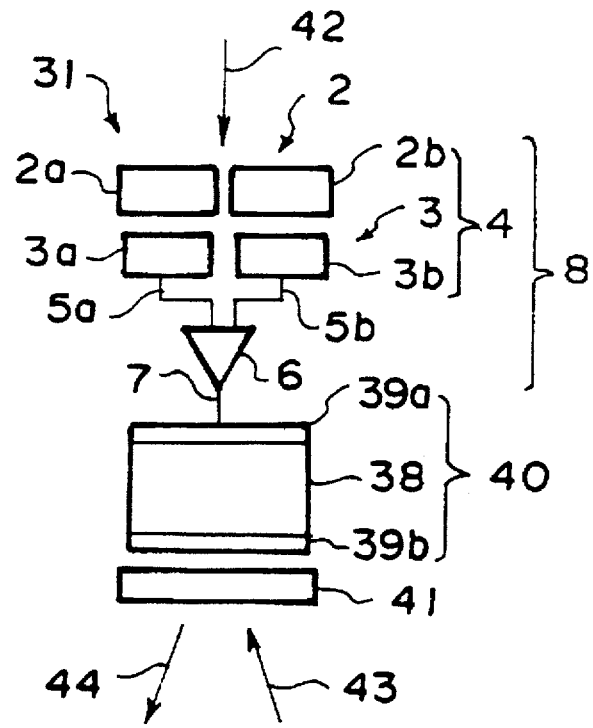
FIG. 5 shows an optical neuron element according to a third embodiment of a modulating optical operation element of this invention.

FIG. 5 shows the structure of optical neuron elements according to a third embodiment of a modulating optical operation element of this invention. As illustrated in FIG. 5, in the positive and negative signal separation filter 2 constituting the photoelectric operation element 8, a pair of light receiving elements 3 and the operation element 6 are the same as those of the optical neuron element according to the first and second embodiments of this invention, and hence the detailed explanation thereof will be omitted here for brevity. An optical neuron element 31 according to a third embodiment of this invention is composed of this photoelectric operation element 8, a reflection type light modulation element 40 made of a reflection type liquid crystal 38 sandwiched between transparent electrodes 39a and 39b, and a polarizer 41 for polarizing light inputted into, and reflected from, this light modulation element 40.

In this embodiment, the separation of red light and blue light is achieved by providing the light receiving separation element 4 with the positive and negative signal separation filter 2. However, there is no special need for the separation filter 2 to be disposed. Likewise in the first embodiment, the light receiving separation element 4 may be constituted of light receiving elements having a separation sensitivity characteristic relative to red light and blue light, respectively.

When the optical neuron element 31 is simultaneously exposed to blue light representing positive information and red light representing negative information of an information beam 42, the positive and negative information beams are separated from each other by means of the positive and negative signal separation filter 2 of the light receiving separation element 4. The separated information beams are received by the light receiving elements 3a and 3b, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, and whereby an electric signal 7 corresponding to this operation result is outputted. The light modulation element 40 is modulated in response to this electric signal 7. When the light modulation element 40 thus modulated is exposed to a read beam 43 such as white light, the read beam 43 is polarized by means of the polarizer 41. The polarized read beam 43 is subjected to reflection modulation by the light modulation element 40 and polarized again by the polarizer 41, and is eventually outputted as an information beam 44.

An optical neuron layer for outputting an information beam made of light outputted from each optical neuron element is constituted by arranging a plurality of the optical neuron elements 31 having such a function in a one-dimensional or a two-dimensional shape. A constituent unit of an optical neural network is constituted of the optical neuron layer and a weighted information beam output means for outputting a weighted information beam by weighting a modulated information beam outputted from the optical neuron layer. An optical neural network can be constituted by the connection of a plurality of these constituent units.

Figure 6:
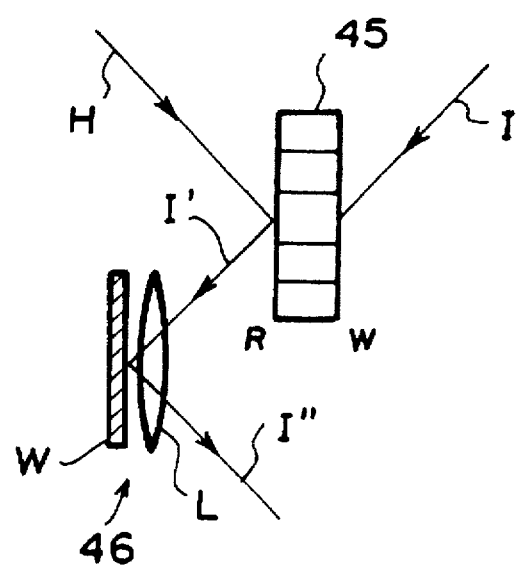
FIG. 6 shows a constituent unit of an optical neural network using optical neuron elements according to a third embodiment of a modulating optical operation element of this invention.

FIG. 6 shows one embodiment of a constituent unit of an optical neural network constituted of the optical neuron elements according the third embodiment of a modulating optical operation element of this invention.

As illustrated in FIG. 6, the constituent unit of an optical neural network constituted of the optical neuron elements according to the third embodiment of this invention comprises an optical neuron layer 45 made by the connection of a plurality of the foregoing optical neuron elements 31 arranged two-dimensionally and a weighting output means 46 composed of a weighting mask W and a lens L. The optical neuron layer 45 is arranged with its light receiving separation elements facing to the right in the drawing. The W side of the optical neuron layer 45 is exposed to an information beam I in which positive information is represented by blue light and negative information is represented by red light. The irradiated information beam I is then subjected to the foregoing operation by means of each of the optical neuron elements which constitute the optical neuron layer 45. A light modulation element in each optical neuron element is modulated in response to the information beam inputted to each optical neuron element. Thereafter, the R side of the optical neuron layer 16 is exposed to a read/write beam H such as white light. The irradiated read/write beam H is subjected to reflection-modulation by the light modulation element of each optical neuron element which constitutes the optical neuron layer 45, and then outputted as an information beam I'. The outputted information beam I' passes through the lens L, and is weighted by the mask W. A resulting beam is then outputted as a weighted information beam I". The weighting mask W is composed of a blue filter and a red filter so that it can effect desired weighting.

Figure 7:
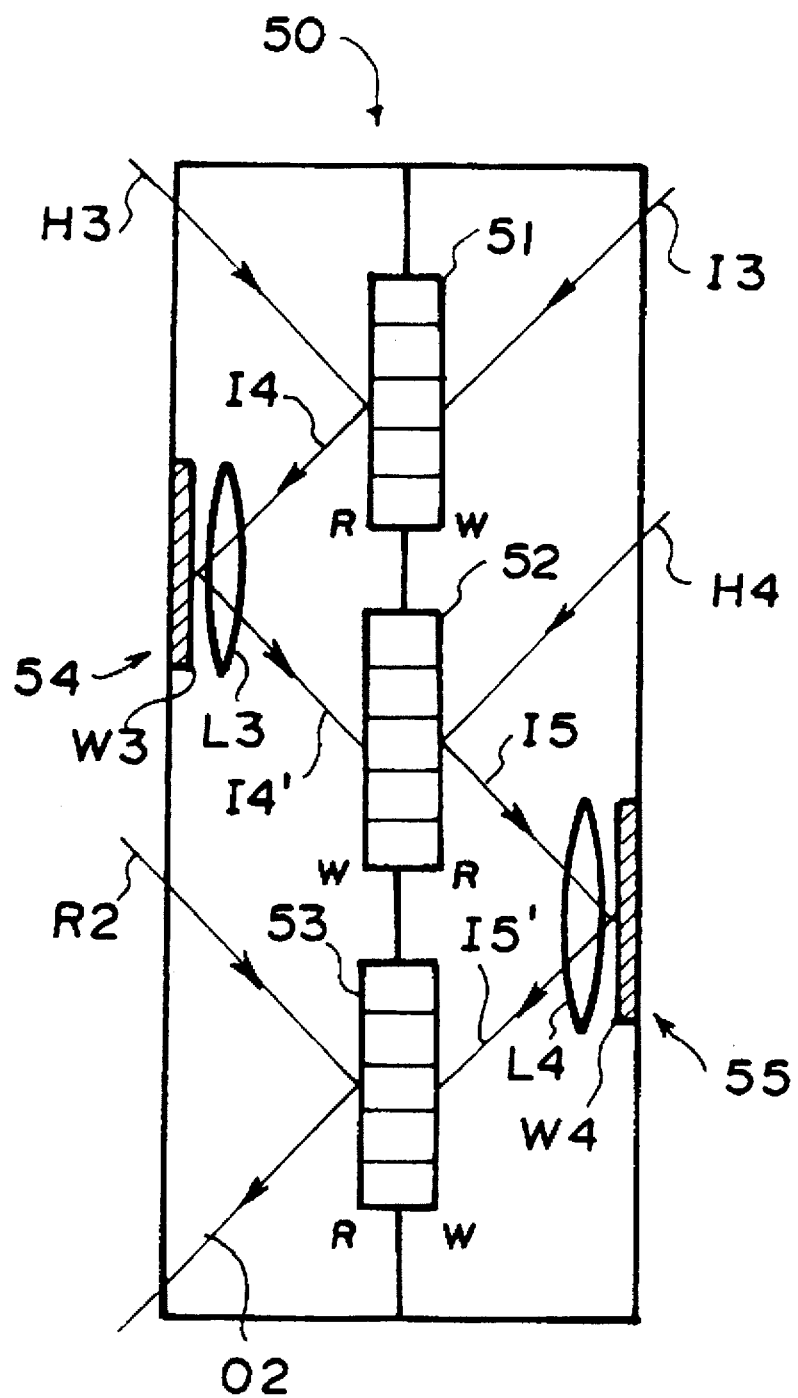
FIG. 7 shows an optical neural network constituted by the connection of a plurality of constituent units of an optical neural network using optical neuron elements according to a third embodiment of a modulating optical operation element of this invention.

FIG. 7 shows an optical neural network constituted by the connection of a plurality of such constituent units of an optical neural network.

As illustrated in FIG. 7, in an optical neural network 50, two constituent units are connected together so that they can be opposite to each other. An information beam is weighted by a weighting means of each constituent unit, and this weighted information beam is transferred to another constituent unit on the next stage. With such an arrangement in which the constituent units are arranged opposite to each other, it is possible to constitute a compact neural network, and also to improve the accuracy of the arrangement of the constituent units.

An information beam I3 is inputted into the W side of an optical neuron layer 51 of a constituent unit of a first optical neural network. A light modulation element of each optical neuron element in the optical neuron layer 51 is modulated in response to this information beam I3. The R side of the optical neuron layer 51 is then exposed to a read/write beam H3, and the read/write beam H3 is modulated in response to an information beam recorded in the optical neuron layer 51, and an information beam is eventually outputted. This outputted information beam I4 is weighted by means of a weighting means 54 composed of a lens L3 and a weighting mask W3. This weighted information beam I4' is inputted into the W side of an optical neuron layer 52 of a constituent unit of a second neural network. In response to this information beam I4', a light modulation element of each optical neuron element in the optical neuron layer 52 is modulated. At this time, the transfer of an information beam from one optical neuron element of the optical neuron layer 51 to the optical neuron layer 52 is a locally coupled type transfer. In this locally coupled type transfer, an information beam is only transferred to an optical neuron element in the vicinity of one optical neuron element on the optical neuron layer 52 which corresponds to one optical neuron element on the optical neuron layer 51. Likewise in the optical neuron layer 51, the R side of the optical neuron layer 52 is exposed to a read/write beam H4, and the read/write beam H4 is modulated in response to an information beam recorded in the optical neuron layer 52, and an information beam is eventually outputted. This outputted information beam I5 is subjected to a weighting which is different from the weighting mask W3 by means of a weighting means 55 composed of a lens L4 and a weighting mask W4, and then reflected. This weighted information beam I5' is inputted into an output optical neuron layer 53. As mentioned above, a light modulation element of each optical neuron element is modulated in response to this information beam I5'. The information beam I5' recorded in this optical neuron layer 53 is read when the R side of the optical neuron layer 53 is exposed to a read beam R2, and a processed information beam O2 is eventually outputted.

In this neural network 50, each optical neuron layer constitutes one neuron layer, and a common weight of connection is used for any point of each layer. In other words, the neural network is in a space invariant state. Hence, it is possible to realize a weighted connection between layers.

Figure 8:
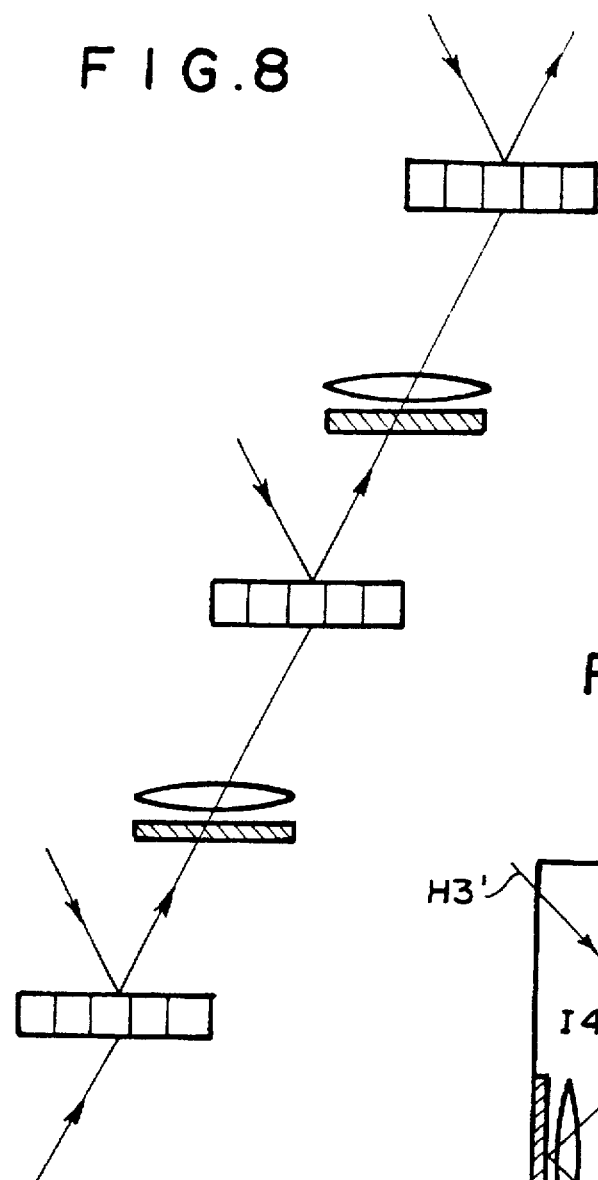
FIG. 8 shows another optical neural network constituted by the connection of a plurality of constituent units of an optical neural network using optical neuron elements according to a third embodiment of a modulating optical operation element of this invention.

In the aforementioned third embodiment of this invention, an explanation is given of an optical neural network in which the optical neuron layers and the weighting output means are arranged opposite to each other. The constituent unit of an optical neural network, according to the third embodiment of a modulating optical operation element of this invention, is not restricted to such a configuration. For example, as shown in FIG. 8, the weighting output means may be constituted of a transparent type weighting means, and a neural network may be built by alternately arranging optical neuron layers and the weighting output means in series.

An explanation will now be given of an optical neural network provided with constituent units of an optical neural network, each constituent unit comprising the first optical neuron layers, weighting output means, second optical neuron layers and an information beam re-input means for inputting a modulated information beam outputted from the second neuron layer back into the first optical neuron layer.

Figure 9:
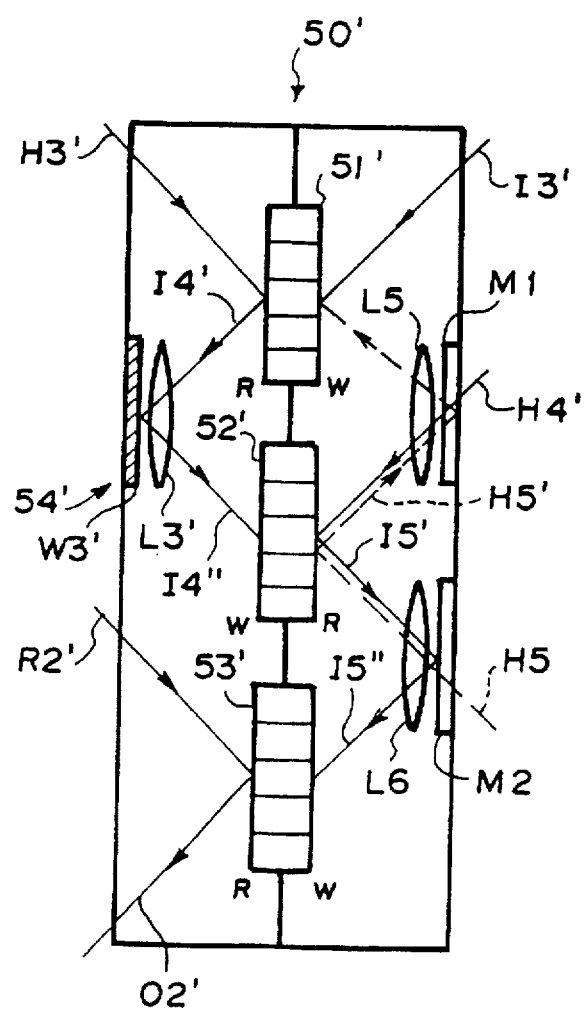
FIG. 9 shows an optical neural network made of constituent units of an optical neural network having an information beam re-input means.

FIG. 9 shows an optical neural network constituted by the connection of a plurality of the constituent units of an Optical neural network having the foregoing information beam re-input means and the constituent units of an optical neural network according to the third embodiment shown in FIG. 6. The same reference numerals with an apostrophe "'" are provided to designate the corresponding features of the optical neural network shown in FIG. 7, and the detailed explanation thereof is omitted here for brevity.

The optical neural network shown in FIG. 9 is provided with half mirrors M1 and M2 and lenses L5 and L6 as an information beam re-input means.

An information beam I3' inputted into an optical neural network 50' is read by means of a read/write beam H3' in the same manner as the foregoing optical neural network, and weighted by a weighting output means 54', and then transferred to an optical neuron layer 52'. An information beam I4" transferred to the optical neuron layer 52' is inputted into the W side of the optical neuron layer 52', and a light modulation element of each optical neuron element in the optical neuron layer 52' is modulated in response to this information beam I4". The optical neuron layer 52' is exposed to a re-read/write beam H5 via a half mirror M2 and a lens L6. The re-read/write beam H5 is modulated in response to the information beam I4" recorded in the optical neuron layer 52', so that the information beam I4" is read. The information beam I4" thus read out is reflected from a half mirror M1 via a lens L5 in the form of an information beam H5', and is inputted back into the W side of the optical neuron layer 51' on a stage prior to the optical neuron layer 52'. At this time, the information beam I3" which has been transferred and recorded to the optical neuron layer 51' is erased.

In the optical neuron layer 51', a light modulation element of each optical neuron element is modulated in response to the information beam H5' inputted back into the optical neuron layer 51'. The R side of the optical neuron layer 51' is exposed to a read/write beam H3', the read/write beam H3' is modulated in response to the information beam H5' recorded in the optical neuron layer 51', and the information beam H5' is eventually read. An information beam I5' thus read out is weighted again by means of a weighting output means 54' composed of a lens L3' and a weighting mask W3', and then reflected. The reflected information beam enters the W side of the optical neuron layer 52', and a light modulation element of each optical neuron element in the optical neuron layer 52' is modulated in response to this information beam I4'. Even at this time, since the information beam I4" which has been recorded in the optical neuron layer 52' is erased, each optical neuron element in the optical neuron layer 52' is modulated in response to a new information beam. The iteration of these processing brings about the repetition of weighting of the information beam I3' inputted into the optical neuron layer 51' by means of the weighting mask W3', and hence it is possible to enhance weighting to a greater extent.

After the above-mentioned processing is repeated a necessary number of times, the R side of the optical neuron layer 52' is exposed to a read/write beam H4' via the half mirror M1 and the lens 54. The read/write beam H4' is modulated in response to the information beam I4" recorded in the optical neuron layer 52', so that an information beam I5' is read. This information beam I5' thus read out is reflected from the half mirror M2 via the lens L6, and enters an output optical neuron layer 53' as an information beam I5". As described above, a light modulation element of each optical neuron element is modulated in response to this information beam I5". The information beam I5" recorded in the optical neuron layer 53' is read in the same manner as the optical neural network shown in FIG. 7, and a processed information beam O2' is eventually outputted.

In the embodiment of an optical neural network having the foregoing information beam re-input means, an explanation was given of the optical neural network, according to the third embodiment as shown in FIG. 6, having the information beam re-input means. However, this information beam re-input means is not restricted to this embodiment, but may be applied to an optical neural network using the optical neuron elements of the first or the second embodiment as shown in FIG. 4 or an optical neural network arranged in series which uses the optical neuron elements of the third embodiment as shown in FIG. 8.

In the above-mentioned embodiment, a blue filter and a red filter are used as filter means of the light receiving separation element, and light signals carrying positive and negative information represented by blue and red light are transferred. These information signals are separated and subjected to an operation. Alternately, the filter means may be constituted of orthogonal polarizing plates, and positive and negative information beams may be transferred in the form of orthogonal polarized light signals. Thereafter, these polarized beams may be separated and subjected to an operation by the light receiving separation element. In this case, the weighting mask should be made of orthogonal polarizing plates.

First Embodiment of Optical Operation Element

Embodiments of an optical operation element of this invention will now be described.

Figure 10:
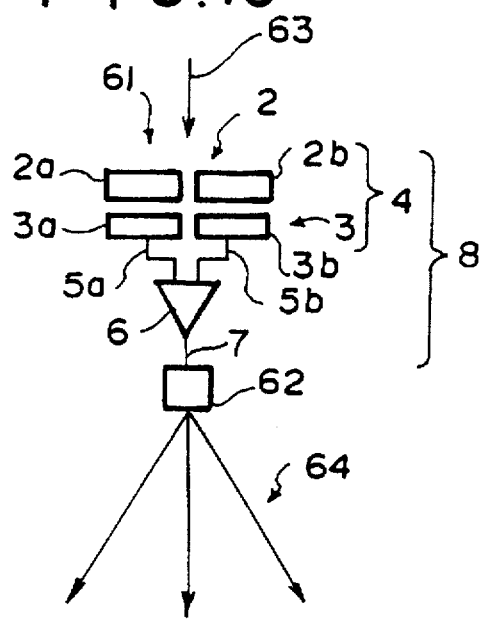
FIG. 10 shows an optical neuron element according to a first embodiment of an optically operating light emitting element of this invention.

FIG. 10 shows an optical neuron element according to a first embodiment of an optical operation light emitting element of this invention.

As illustrated in FIG. 10, in the positive and negative signal separation filter 2 constituting the photoelectric operation element 8, a pair of the light receiving elements 3 and the operation element 6 are the same as those of the optical neuron element according to the second and third embodiments of an optical neuron element of this invention, and hence the detailed explanation thereof will be omitted here for brevity. An optical neuron element 61 according to a first embodiment of an optical operation light emitting element of this invention is made up of this photoelectric operation element 8 and a light emitting element 62 which emits light at an intensity in accordance with an electric signal corresponding to an operation result outputted from this photoelectric operation element 8.

In this embodiment, the separation of red light and blue light is achieved by providing the light receiving separation element 4 with the positive and negative signal separation filter 2. However, there is no special need for such a separation filter 2 to be disposed. As with the first embodiment, the light receiving separation element 4 may be constituted of light receiving elements having a separation sensitivity characteristic relative to red light and blue light, respectively.

When the optical neuron element 61 is concurrently exposed to both blue light representing positive information and red light representing negative information of a light signal 63, the positive and negative information beams are separated from each other by means of a blue filter 2a and a red filter 2b of the positive and negative signal separation filter 2. The separated information beams are received by light receiving elements 3a and 3b, respectively, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, whereby an electric signal 7 corresponding to the result of this operation is outputted. The light emitting element 62 emits light in response to the intensity of this electric signal 7. The light emitted from this light emitting element 62 is outputted in the form of an information beam 64.

An optical neuron layer for outputting an information beam composed of light outputted from each optical neuron element is constituted by arranging a plurality of the optical neuron elements 1 having such a function in a one-dimensional or a two-dimensional shape. A constituent unit of an optical neural network is constituted of the optical neuron layer and a weighting means for outputting a weighted information beam by weighting a modulated information beam outputted from the optical neuron layer. Likewise in the first, second and third embodiments, an optical neural network can be constituted by the connection of a plurality of these constituent units of an optical neural network.

Figure 11:
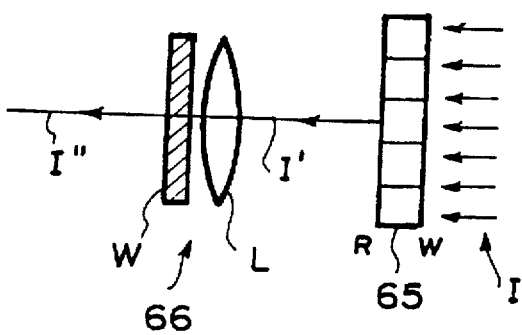
FIG. 11 shows a constituent unit of an optical neural network constituted by the connection of a plurality of optical neuron elements according to a first embodiment of an optical operation light emitting element of this invention.

FIG. 11 shows one embodiment of a constituent unit of an optical neural network, serving as an optical data processing circuit, which is constituted of the optical neuron elements according to the first embodiment of a modulating optical operation element of this invention.

As illustrated in FIG. 11, the constituent unit of an optical neural network constituted of the optical neuron elements, according to the first embodiment, comprises an optical neuron layer 65 made by the connection of a plurality of foregoing optical neuron elements 61 arranged two-dimensionally and a weighting output means 66 composed of a weighting mask W and a lens L. The optical neuron layer 65 is arranged with its light receiving separation elements facing to the right in the drawing. The W side of the optical neuron layer 65 is exposed to an information beam I in which positive information is represented by blue light and negative information is represented by red light. The irradiated information beam I is then subjected to the foregoing operation by means of each of the optical neuron elements which constitute the optical neuron layer 65, and a light emitting element of each optical neuron element emits light in response to an information beam inputted into each optical neuron element. This emitted light is then outputted as an information beam I', and the outputted information beam I' passes through the lens L, and is weighted by the mask W. A resulting beam is then outputted as a weighted information beam I". The weighting mask W is composed of a blue filter and a red filter so that it can effect desired weighting.

Figure 12:
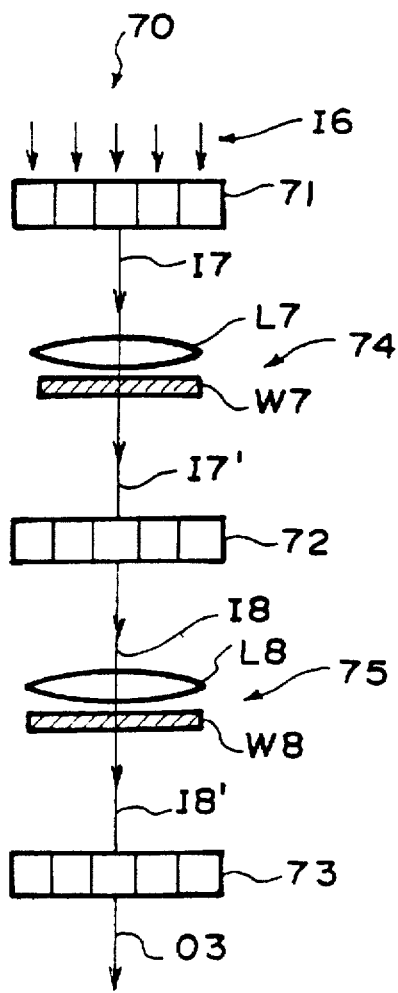
FIG. 12 shows an optical neural network constituted by the connection of a plurality of constituent units of an optical neural network using optical neuron elements according to a first embodiment of an optical operation light emitting element of this invention.

FIG. 12 shows an optical neural network constituted by the connection of a plurality of such constituent units of an optical neural network.

As illustrated in FIG. 12, in an optical neural network 70, two constituent units are connected together so that they can be opposite to each other. An information beam is weighted by a weighting means of each constituent unit, and this weighted information beam is transferred to another constituent unit on the next stage.

An information beam I6 is inputted into an optical neuron layer 71 of a constituent unit of a first optical neural network. Each optical neuron element of the optical neuron layer 71 performs an operation in response to the information beam I6, and a light emitting element of each optical neuron element emits light. The information beam I6 is then modulated and outputted as an information beam I7. This outputted information beam I7 is weighted by means of a weighting means 74 composed of a lens L7 and a weighting mask W7. This weighted information beam I7' is inputted into an optical neuron layer 72 of a constituent unit of a second neural network. At this time, the transfer of an information beam from one optical neuron element of the optical neuron layer 71 to the optical neuron layer 72 is a locally coupled type transfer. In this locally coupled type transfer, an information beam is only transferred to an optical neuron element in the vicinity of one optical neuron element on the optical neuron layer 72 which corresponds to one optical neuron element on the optical neuron layer 71. Similarly, each optical neuron element of the optical neuron layer 72 emits light in response to the inputted information beam I7', and this information beam I7' is modulated and outputted as an information beam I8. This outputted information beam I8 is subjected to a weighting which is different from the weighting mask W7 by means of a weighting means 75 composed of a lens L8 and a weighting mask W8. This weighted information beam I8' is inputted into an output optical neuron layer 73. The information beam I8' recorded in this optical neuron layer 73 is subjected to an operation by the optical neuron layer 73, and a light emitting element of each optical neuron element emits light. A processed information beam O3 is eventually outputted.

In this neural network 70, each optical neuron layer constitutes one neuron layer, and a common weight of connection is used for any point of each layer. In other words, the neural network is in a space invariant state. Hence, it is possible to realize a weighted connection between layers.

As with the third embodiment of a modulating optical operation element of this invention, it is possible to iterate the weighting of the information beam I8 by means of the weighting mask W8 of the weighting output means 75 by providing the optical operation light emitting element of the first embodiment of this invention with an information beam re-input means which inputs the information beam I8' outputted from the optical neuron layer 72 and weighted by the weighting means 75 back into the optical neuron layer 72.

Second Embodiment of Optical Operation Light Emitting Element

Figure 13:
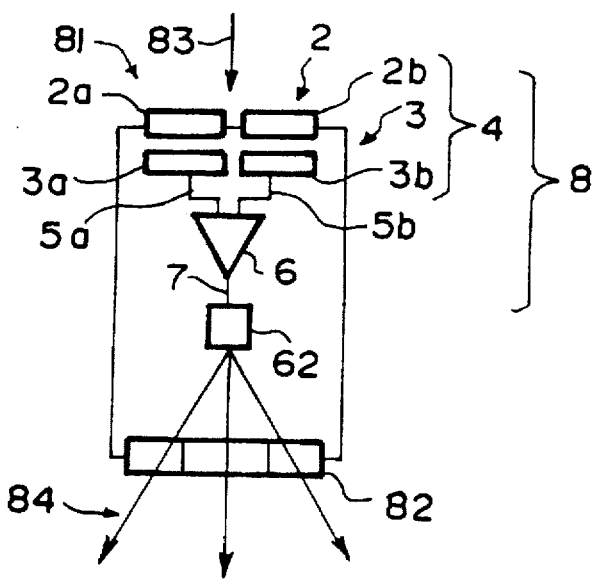
FIG. 13 shows an optical neuron element according to a second embodiment of an optically operating light emitting element of this invention.

FIG. 13 shows an optical neuron element according to a second embodiment of an optical operation light emitting element of this invention. As illustrated in FIG. 13, in the positive and negative signal separation filter 2 constituting the photoelectric operation element 8, a pair of the light receiving elements 3 and the operation element 6 are the same as those of the optical neuron element according to the foregoing embodiments of an optical neuron element of this invention, and hence the detailed explanation thereof will be omitted here for brevity. An optical neuron element 81 according to a second embodiment of this invention is composed of this photoelectric operation element 8, a light emitting element 62 for emitting light in accordance with an electric signal corresponding to an operation result outputted from this photoelectric operation element 8, and a weighting mask 82 for weighting light emitted from this light emitting element 62.

In this embodiment, the separation of red light and blue light is achieved by providing the light receiving separation element 4 with the positive and negative signal separation filter 2. However, there is no special need for such a separation filter 2 to be disposed. As with the first embodiment, the light receiving separation element 4 may be constituted of light receiving elements having a separation sensitivity characteristic relative to red light and blue light, respectively.

When the optical neuron element 71 is simultaneously exposed to both blue light representing positive information and red light representing negative information of a light signal 83, the positive and negative information beams are separated from each other by means of a blue filter 2a and a red filter 2b of the positive and negative signal separation filter 2. The separated information beams are received by light receiving elements 3a and 3b, respectively, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, whereby an electric signal 7 corresponding to the result of this operation is outputted. The light emitting element 62 emits light at an intensity in accordance with this electric signal 7. The light emitted from this light emitting element 62 is weighted by the weighting mask 82, and this weighted light is outputted as an information beam 84.

An optical neuron layer for outputting an information beam composed of light outputted from each optical neuron element is constituted by arranging a plurality of the optical neuron elements 1 having such a function in a one-dimensional or a two-dimensional shape. An optical neural network can be constituted by the connection of a plurality of these optical neuron layers. In the optical neuron layer according to this embodiment, since each optical neuron element which constitutes this optical neuron layer is provided with a weighting mask 82, a constituent unit of an optical neural network is made up of one optical neuron layer.

Figure 14:
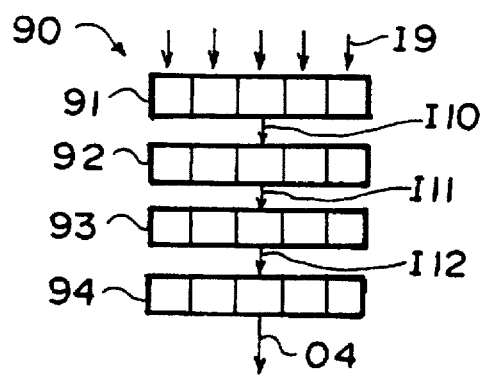
FIG. 14 shows an optical neural network constituted by the connection of a plurality of optical neuron layers made of a plurality of optical neuron elements according to a second embodiment of an optical operation light emitting element of this invention.

FIG. 14 shows an optical neural network constituted by the connection of a plurality of optical neuron layers, each of which is made by two-dimensionally arranging a plurality of optical neuron elements shown in FIG. 13. As shown in FIG. 14, four constituent units are arranged in series in an optical neural network. An information beam is weighted by each layer, and this weighted information beam is transferred to the next layer. Each optical neuron element, according to a fifth embodiment of this invention, is provided with a weighting mask, so there is no need for a weighting means to be interposed between layers. It is possible to constitute a smaller neural network when compared with the first, second and third embodiments of this invention set forth in the above.

An information beam I9 is inputted into an optical neuron layer 91 which is a constituent unit of a first optical neural network. Each optical neuron element of the optical neuron layer 91 performs an operation in response to the information beam I9, and a light emitting element of each optical neuron element emits light, and the information beam I9 is modulated. This outputted beam is weighted by a weighting mask of each optical neuron element, and is outputted as an information beam I10. This weighted information beam I10 is inputted into an optical neuron layer 92 of a constituent unit of a second neural network. At this time, the transfer of an information beam from one optical neuron element of the optical neuron layer 91 to the optical neuron layer 92 is a locally coupled type transfer. In this locally coupled type transfer, an information beam is only transferred to an optical neuron element in the vicinity of one optical neuron element on the optical neuron layer 92 which corresponds to one optical neuron element on the optical neuron layer 91. Similarly, each optical neuron element of the optical neuron layer 92 emits light in response to the inputted information beam I10, and the information beam I10 is modulated. This modulated information beam I10 is weighted by means of a weighting mask of each optical neuron element. This weighted information beam is then outputted as an information beam I11. The outputted information beam I11 is weighted by an optical neuron layer 93 in the same manner as the optical neuron layer 92, and an information beam I12 is outputted. This outputted information beam I12 is further weighted by an optical neuron layer 94, and a processed information beam 04 is eventually outputted.

In this neural network 90, each optical neuron layer constitutes one neuron layer, and each optical neuron element constituting the optical neuron layer is provided with a weighting mask. Hence, the weighting of each layer is in a space variant state.

Figure 15:
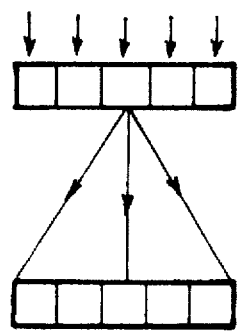
FIG. 15 shows another optical neural network constituted by the connection of a plurality of optical neuron layers made of a plurality of optical neuron elements according to a second embodiment of an optical operation light emitting element of this invention.

In the embodiment shown in FIG. 14, optical neuron layers are arranged in close proximity to each other, and the transfer of information beams between layers is a locally coupled transfer. As shown in FIG. 15, when a distance between layers is increased, an information beam outputted from an optical neuron element which constitutes each layer is transferred to all optical neuron elements of an optical neuron layer on the next stage. It is possible to establish a total coupling type neural network by varying a distance between layers.

Third Embodiment of Optical Light Emitting Element

Figure 16:
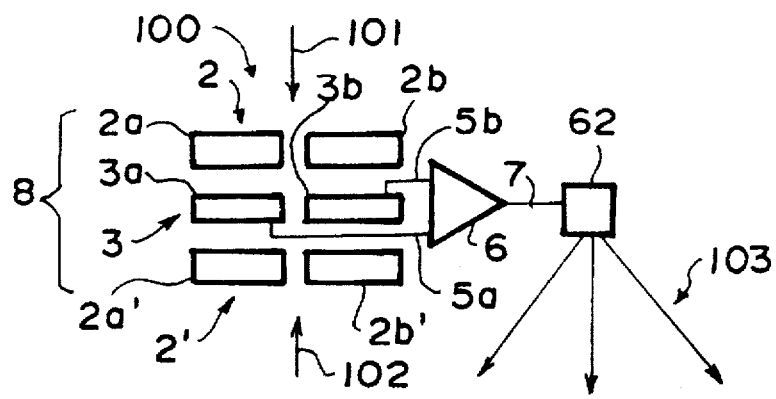
FIG. 16 shows an optical neuron element according to a third embodiment of an optical operation light emitting element of this invention.

FIG. 16 shows an optical neuron element according to a third embodiment of an optical operation light emitting element of this invention. As illustrated in FIG. 16, the positive and negative signal separation filter 2 constituting the photoelectric operation element 8, a pair of the light receiving elements 3, the operation element 6 and the light emitting element 62 are the same as those of the optical neuron element according to the foregoing embodiments of an optical neuron element of this invention, and hence the detailed explanation thereof will be omitted here for brevity. An optical neuron element 100 according to a third embodiment is provided with the photoelectric operation element 8 of the optical neuron element 61 according to the first embodiment of an optical operation light emitting element and a positive and negative separation filter 2' composed of a blue filter 2a' and a red filter 2b', whereby the pair of light receiving elements 3 can receive information beams from both the positive and negative signal separation filters 2 and 2'.

In this embodiment, the separation of red light and blue light is achieved by providing the light receiving separation element 4 with the positive and negative signal separation filter 2. However, there is no special need for such a separation filter 2 to be disposed. As with the first embodiment, the light receiving separation element 4 may be constituted of light receiving elements having a separation sensitivity characteristic relative to red light and blue light, respectively.

When an optical neuron element 100 is simultaneously exposed to both blue light representing positive information and red light representing negative information of a light signal 101 or an information beam 102, the positive and negative information beams are separated from each other by means of the blue filter 2a and the red filter 2b of the positive and negative signal separation filter 2 and also the blue filter 2a' and the red filter 2b' of the positive and negative signal separation filter 2'. The separated information beams are received by light receiving elements 3a and 3b, respectively, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, and whereby an electric signal 7 corresponding to this operation result is outputted. The light emitting element 62 emits light at an intensity in accordance with this electric signal 7. The light emitted from this light emitting element 62 is outputted as an information beam 103.

An optical neuron layer for outputting an information beam composed of light outputted from each optical neuron element is constituted by arranging a plurality of the optical neuron elements 100 having such a function in a one-dimensional or a two-dimensional shape. A constituent unit of an optical neural network is constituted of this optical neuron layer and a weighting means for weighting a modulated information beam outputted from this optical neuron layer and outputting this weighted information beam. It is possible to constitute an optical neural network by the connection of a plurality of these constituent units of an optical neural network in the same manner as the first embodiment of an optical operation light emitting element of this invention.

The optical neuron element according to the third embodiment of an optical operation light emitting element can receive an information beam from two different directions, and hence when a constituent unit of an optical neural network comprising an optical neuron layer composed of these optical neuron elements and a weighting output means is further provided with an information beam re-input means, it is possible to more easily constitute an optical neural network which iterates the weighting of an information beam in the same fashion as the first embodiment of an optical operation light emitting element.

The constituent unit of an optical neural network according to the third embodiment of an optical operation light emitting element and its arrangement are substantially the same as the constituent unit of the optical neural network according to the first embodiment of an optical operation light emitting element and the arrangement thereof, and hence the detailed explanation thereof are omitted here for brevity.

Fourth Embodiment of Optical Light Emitting Element

Figure 17:
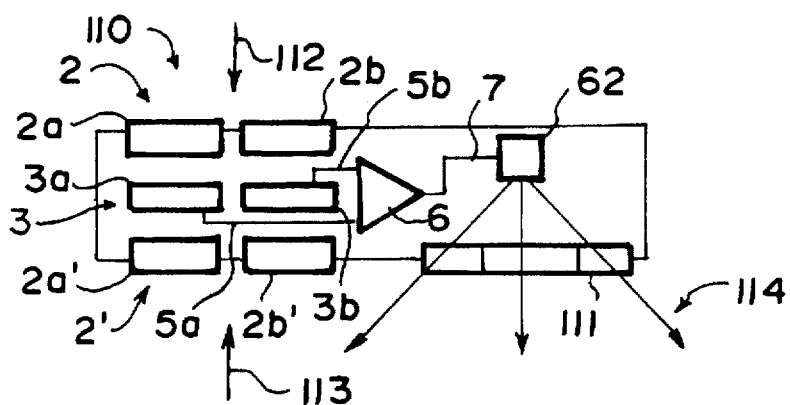
FIG. 17 shows an optical neuron element according to a fourth embodiment of an optical operation light emitting element of this invention.

FIG. 17 shows an optical neuron element according to a fourth embodiment of an optical operation light emitting element of this invention. As illustrated in FIG. 17, in the positive and negative signal separation filters 2 and 2' which can receive information beams from two different directions and constitutes the photoelectric operation element 8, a pair of the light receiving elements 3, the operation element 6 and the light emitting element 62 are the same as those of the optical neuron element according to the third embodiment of an optical neuron element of this invention, and hence the detailed explanation thereof will be omitted here for brevity. An optical neuron element 110 according to a fourth embodiment is constituted by providing the optical neuron element 100 according to the third embodiment of an optical operation light emitting element with a weighting mask 111 for weighting light emitted from the light emitting element 62.

In this embodiment, the separation of red light and blue light is achieved by providing the light receiving separation element 4 with the positive and negative signal separation filter 2. However, there is no special need for such a separation filter 2 to be disposed. As with the first embodiment, the light receiving separation element 4 may be constituted of light receiving elements having a separation sensitivity characteristic relative to red light and blue light, respectively.

When an optical neuron element 71 is simultaneously exposed to both blue light representing positive information and red light representing negative information of a light signal 112 or 113, the positive and negative information beams are separated from each other by means of the blue filter 2a and the red filter 2b of the positive and negative signal separation filter 2 and also the blue filter 2a' and the red filter 2b' of the positive and negative signal separation filter 2'. The separated information beams are received by light receiving elements 3a and 3b, respectively, whereupon the information is outputted in the form of an electric signal 5a representing positive information and an electric signal 5b representing negative information, respectively. The outputted electric signals 5a and 5b are subjected to addition and subtraction or a non-linear processing by means of the operation element 6, and whereby an electric signal 7 corresponding to this operation result is outputted. The light emitting element 62 emits light at an intensity in accordance with this electric signal 7. The light emitted from this light emitting element 62 is weighted by the weighting mask 111, and the weighted light is outputted as an information beam I14.

An optical neuron layer for outputting an information beam composed of light outputted from each optical neuron element is constituted by arranging a plurality of the optical neuron elements 1 having such a function in a one-dimensional or a two-dimensional shape. It is possible to constitute an optical neural network by the connection of a plurality of these optical neuron layers in the same manner as the second embodiment of an optical operation light emitting element of this invention.

The optical neuron element according to the fourth embodiment of an optical operation light emitting element can receive an information beam from two different directions, and hence when a constituent unit of an optical neural network comprising an optical neuron layer (i.e., a constituent unit of an optical neural network) composed of these optical neuron elements and an information beam re-input means are combined together, it is possible to constitute an optical neural network which iterates the weighting of an information beam.

Figure 18:
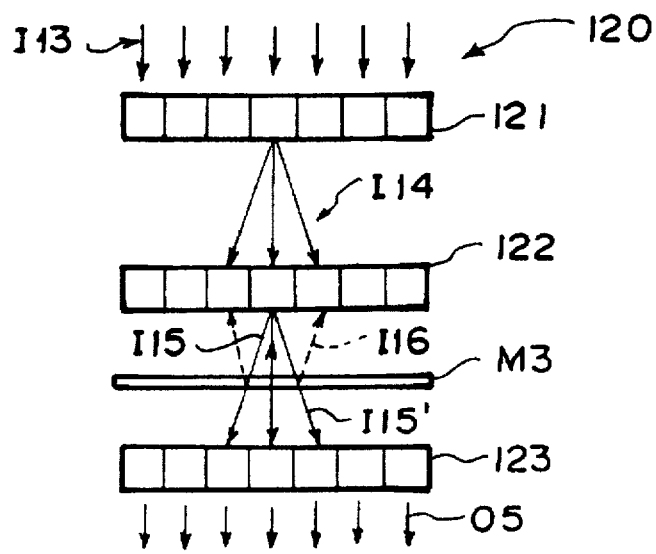
FIG. 18 shows an optical neural network provided with an information beam re-input means and constituted by the connection of a plurality of optical neuron layers made of a plurality of optical neuron elements according to a fourth embodiment of an optical operation light emitting element of this invention.

FIG. 18 shows an optical neural network constituted by providing an optical neural network made of optical neuron elements, according to the fourth embodiment of an optical operation light emitting element, with an information beam re-input means.

The optical neural network according to the fourth embodiment of an optical operation light emitting element is substantially structurally the same as that of the second embodiment as shown in FIG. 14, and hence the detailed explanation thereof will be omitted here for brevity.

As illustrated in FIG. 18, in an optical neural network 120, three optical neuron layers are arranged in series, and an information beam is subjected to a weighting at every layer. The weighted information beam is transferred to the next layer. Each optical neuron element, according to the fourth embodiment of this invention, is provided with a weighting mask, and as with the second embodiment of an optical operation light emitting element, there is no need for a weighting output means to be disposed between layers, so that it is possible to constitute a compact neural network. In the optical neural network shown in FIG. 18, the positive and negative signal separation filter 2 of the optical neuron element constituting each optical neuron layer is disposed above the optical neuron layer, whilst the positive and negative signal separation filter 2' is disposed below the same.

An information beam I13 is inputted into an optical neuron layer 121 which serves as a constituent unit of a first optical neural network. Each optical neuron element of the optical neuron layer 121 performs an operation in accordance with this information beam I13. A light emitting element of each optical neuron element emits light, and the information beam I13 is modulated. The modulated information beam is then weighted by a weighting mask of each optical neuron element, and outputted as an information beam I14. This weighted information beam I14 is then inputted into an optical neuron layer 122 which acts as a constituent unit of a second optical neural network. At this time, the transfer of an information beam from one optical neuron element of the optical neuron layer 121 to the optical neuron layer 122 is a locally coupled type transfer. In this locally coupled type transfer, an information beam is only transferred to an optical neuron element in the vicinity of one optical neuron element on the optical neuron layer 122 which corresponds to one optical neuron element on the optical neuron layer 121. Similarly, each optical neuron element of the optical neuron layer 122 emits light in response to the inputted information beam I14, and this information beam I14 is modulated and also weighted by a weighting mask of each optical neuron element. This weighted beam is then outputted as an information beam I15. The outputted information beam I15 is reflected from a half mirror M3, and the reflected information beam I16 is inputted back into the optical neuron layer 122 by way of the positive and negative signal separation filter 2' of the photoelectric operation element 8 in the optical neuron layer 122. In this case, an information beam I15' passed through the half mirror M3 may be disregarded. The optical neuron layer 122 emits light in response to the re-inputted information beam I16, and this information beam I16 is modulated. The modulated information beam I16 is also weighted by the weighting mask of the optical neuron element, and is outputted as the information beam I15 again. The repetition of the foregoing processing causes the weighting of the information beam I14 by means of the weighting mask of the optical neuron layer 122 to be iterated, whereby the weighting of the information beam can be enhanced.

After the foregoing processing has been repeated a necessary number of times, the information beam I15' passed through the half mirror M3 is inputted into a weighting output means 123. This information beam is weighted further more, and a processed information beam O5 is eventually outputted.

The above-mentioned embodiment of an optical neural network provided with an information beam re-input means can be applied not only to an optical neural network according to the fourth embodiment of an optical operation light emitting element but also to an optical neural network according to a third embodiment of an optical operation light emitting element.

The optical neuron layer in the foregoing embodiment is composed of a plurality optical neuron elements two-dimensionally arranged, but the optical neuron elements may be arranged one-dimensionally.

An optical neuron layer for outputting an information beam made of light emitted from each optical neuron element is constituted by cylindrically arranging a plurality of optical neuron elements, according to either the second or the third embodiment. It is possible to constitute an optical neural network by the connection of a plurality of these optical neuron layers.

Figure 19:
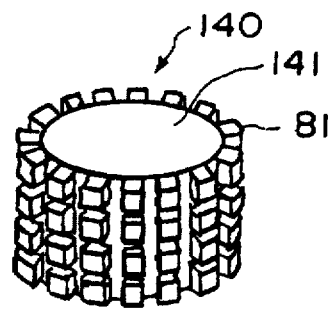
FIG. 19 shows an optical neuron layer constituted of cylindrically arranged optical neuron elements according to a second or a fourth embodiment of an optical operation light emitting element of this invention.

FIG. 19 shows an optical neuron layer in which a plurality of optical neuron elements, according to a second embodiment of an optical operation light emitting element, are cylindrically arranged.

As shown in FIG. 19, in an optical neuron layer 140, optical neuron elements 81 are arranged in four rows over a cylindrical surface 141. In this optical neuron layer 140, an information beam is inputted from the inside of the cylinder, and is outputted to the outside of the cylinder.

Figure 20:
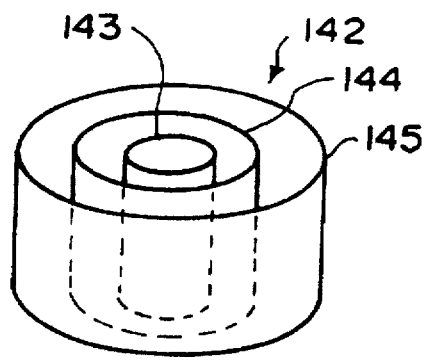
FIG. 20 shows an embodiment of an optical neural network constituted by the connection of a plurality of optical neuron layers made of cylindrically arranged optical neuron elements according to a second or a fourth embodiment of an optical operation light emitting element of this invention.
Figure 21:
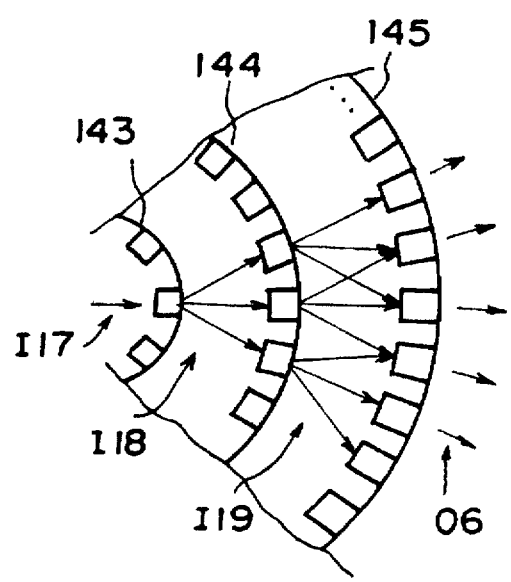
FIG. 21 is a partially enlarged view showing an embodiment of an optical neural network constituted by the connection of a plurality of optical neuron layers made of cylindrically arranged optical neuron elements according to a second or fourth embodiment of optical computing light emitting element according to this invention.

FIG. 20 shows an optical neural network constituted by concentrically connecting a plurality of cylindrical optical neuron layers, each having a different diameter, together. In the drawing, the optical neuron element is omitted for simplicity. As shown in FIG. 20, three optical neuron layers 143, 144 and 145 are concentrically arranged in the optical neural network 142, and each layer weights an information beam. The weighted information beam is then transferred to the next layer. With reference to FIG. 21, the transfer of an information beam in the optical neural network 142 will be described hereunder.

As shown in FIG. 21, an information beam I17 is inputted into an optical neuron layer 143 which serves as a constituent unit of a first optical neural network. Each optical neuron element of the optical neuron layer 143 performs an operation in accordance with this information beam I17. A light emitting element of each optical neuron element emits light, and the information beam I17 is modulated. The modulated information beam is then weighted by a weighting mask of each optical neuron element, and outputted as an information beam I18. This weighted information beam I18 is then inputted into an optical neuron layer 144 which acts as a constituent unit of a second optical neural network. At this time, the transfer of an information beam from one optical neuron element of the optical neuron layer 143 to the optical neuron layer 142 is a locally coupled type transfer. In this locally coupled type transfer, an information beam is only transferred to an optical neuron element in the vicinity of one optical neuron element on the optical neuron layer 144 which corresponds to one optical neuron element on the optical neuron layer 143. Similarly, each optical neuron element of the optical neuron layer 144 emits light in response to the inputted information beam I18, and this information beam I18 is modulated and also weighted by a weighting mask of each optical neuron element. This weighted beam is then outputted as an information beam I19. The outputted information beam I19 is weighted by an optical neuron layer 145 in a similar manner to the optical neuron layer 144, and a processed information beam O6 is eventually outputted.

In this neural network 142, each optical neuron element constitutes one neuron layer, and each of the optical neuron elements which constitute the optical neuron layer is provided with a weighting mask, so that the weighting of each layer is in a space variant state.

In the embodiment shown in FIGS. 19 to 21, the optical neuron layer is arranged in such a manner that an information beam is inputted from the inside of the cylinder and outputted to the outside of the cylinder, whereby an optical neural network is constituted so that an information beam can be transferred from an inner optical neuron layer to an outer optical neuron layer. Alternately, the optical neuron layer may be constituted in such a manner that an information beam is inputted from the outside of the cylinder and outputted to the inside of the cylinder, whereby the optical neural network is constituted so that an information beam can be transferred from an outer optical neuron layer to an inner optical neuron layer.

Figure 22:
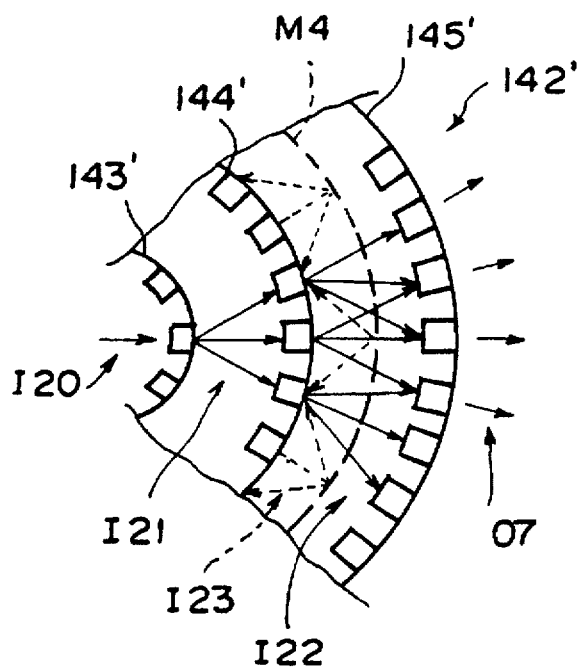
FIG. 22 is a partially enlarged view showing another embodiment of an optical neural network constituted by the connection of a plurality of optical neuron layers made of cylindrically arranged optical neuron elements according to a second or fourth embodiment of optical computing light emitting element according to this invention.

In the embodiments shown in FIGS. 20 and 21, the optical neuron layer may be constituted of optical neuron light emitting elements according to the fourth embodiment, and a half mirror M4 may be interposed between an optical neuron layer 144' and an optical neuron layer 145' in the same manner as an optical neural network 142' as shown in FIG. 22. The optical neural network 142' illustrated in FIG. 22 will now be described.

An information beam I20 is inputted into an optical neuron layer 143' which serves as a constituent unit of a first optical neural network. Each optical neuron element of the optical neuron layer 143' performs an operation in accordance with this information beam I20. A light emitting element of each optical neuron element emits light, and the information beam I20 is modulated. The modulated information beam I20 is then weighted by a weighting mask of each optical neuron element, and outputted as an information beam I21. This weighted information beam I21 is then inputted into an optical neuron layer 144' which acts as a constituent unit of a second optical neural network. At this time, the transfer of an information beam from one optical neuron element of the optical neuron layer 143' to the optical neuron layer 144' is a locally coupled type transfer in the same manner as the aforementioned embodiments. Similarly, each optical neuron element of the optical neuron layer 144' emits light in response to the inputted information beam I21, and this information beam I21 is modulated and also weighted by a weighting mask of each optical neuron element. This weighted beam is then outputted as an information beam I22. The outputted information beam I22 is reflected from a half mirror M4 shown in FIG. 22, and the reflected information beam I23 is inputted back into the optical neuron layer 144' by way of the positive and negative signal separation filter 2' of the photoelectric operation element 8 in the optical neuron layer 144'. The optical neuron layer 144' emits light in response to the re-inputted information beam I23, and this information beam I23 is modulated. The modulated information beam I23 is also weighted by the weighting mask of the optical neuron element, and is outputted as the information beam I23 again. The repetition of the foregoing processing causes the weighting of the information beam I21 inputted into the optical neuron layer 144' by means of the weighting mask of the optical neuron layer 144' to be iterated, whereby the weighting of the information beam can be enhanced.

After the foregoing processing has been repeated a necessary number of times, the information beam I22 passed through the half mirror M4 is inputted into an optical neuron layer 145'. This information beam is weighted further, and a processed information beam O7 is eventually outputted.

An explanation will be given of another embodiment of an optical neural network obtained by connecting a plurality of optical neuron layers in which a plurality of optical neuron elements, according to the second embodiment or the fourth embodiment of an optical operation light emitting element, are cylindrically arranged.

Figure 23:
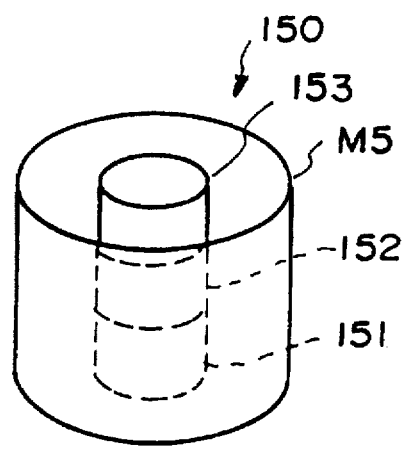
FIG. 23 is a partially enlarged view showing further embodiment of an optical neural network constituted by the connection of a plurality of optical neuron layers made of cylindrically arranged optical neuron elements according to a second or fourth embodiment of optical computing light emitting element according to this invention.

FIG. 23 shows an optical neural network in which three optical neuron layers shown in FIG. 19 are stacked up, and a mirror surrounds the outside of this stacked optical neuron layer. In FIG. 23, optical neuron elements are omitted for simplicity.

As illustrated in FIG. 23, an optical neural network 150 is composed of three optical neuron layers 151, 152 and 153 stacked up one on top of the other, in which each of the optical neuron layers is composed of cylindrically arranged optical neuron elements, according to the fourth embodiment. A mirror M5 with an inner mirror surface surrounds the outside of this cylindrical optical neural network. The function of this optical neural network 150 will now be described.

Figure 24:
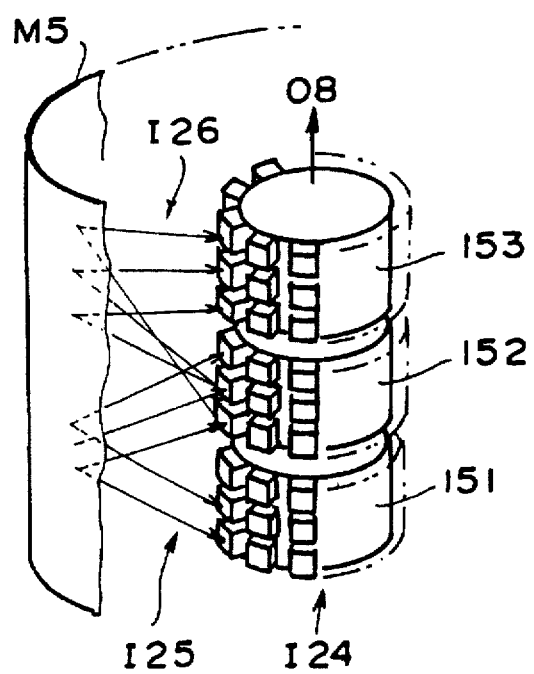
FIG. 24 is a partially enlarged view showing another embodiment of an optical neural network constituted by the connection of a plurality of optical neuron layers made of cylindrically arranged optical neuron elements according to a second or fourth embodiment of optical computing light emitting element according to this invention.

As shown in FIG. 24, an information beam I24 is inputted into an optical neuron layer 151 which serves as a constituent unit of a first optical neural network. Each optical neuron element of the optical neuron layer 151 performs an operation in accordance with this information beam 124. A light emitting element of each optical neuron element emits light, and the information beam 124 is modulated. The modulated information beam is then weighted by a weighting mask of each optical neuron element, and outputted as an information beam 125. This weighted information beam 125 is reflected from the mirror M5, and then inputted into an optical neuron layer 152 which acts as a constituent unit of a second optical neural network. At this time, the transfer of an information beam from one optical neuron element of the optical neuron layer 151 to the optical neuron layer 152 is a locally coupled type transfer. In this locally coupled type transfer, an information beam is only transferred to an optical neuron element in the vicinity of one optical neuron element on the optical neuron layer 152 which corresponds to one optical neuron element on the optical neuron layer 151. Similarly, each optical neuron element of the optical neuron layer 152 emits light in response to the inputted information beam 125, and this information beam 125 is modulated and also weighted by a weighting mask of each optical neuron element. This weighted beam is then outputted as an information beam 126. The outputted information beam 126 is reflected from the mirror M5, and then inputted into an optical neuron layer 153. The information beam is weighted by the optical neuron layer 153, and a processed information beam O8 is eventually outputted.

In this neural network 150, each optical neuron element constitutes one neuron layer, and each of the optical neuron elements which constitute the optical neuron layer is provided with a weighting mask, so that the weighting of each layer is in a space variant state.

In the embodiment shown in FIGS. 23 and 24, the optical neuron layer is arranged in such a manner that an information beam is inputted from the inside of a cylinder and outputted to the outside of the cylinder, whereby an optical neural network is constituted so that a information beam can be transferred from an inner optical neuron layer to an outer optical neuron layer. Alternately, the optical neuron layer may be constituted in such a manner that an information beam is inputted from the outside of the cylinder and outputted to the inside of the cylinder, and a mirror having an outer mirror surface may be provided inside the cylinder. Thereby, the optical neural network may be constituted so that an information beam can be transferred to an optical neuron layer on a next layer by outputting the information beam from an optical neuron layer on an outer cylinder to an inner mirror.

In the embodiment shown in FIGS. 23 and 24, a half mirror may be interposed between an optical neuron layer and a mirror so that the weighting of an information beam can be iterated by inputting an information beam outputted from one optical neuron layer back into the same optical neuron layer.

In the embodiment shown in FIGS. 23 and 24, optical neuron elements constituting an optical neuron layer may be replaced with not only light emitting type optical neuron elements, such as optical neuron elements according to the second or the fourth embodiment of an optical operation light emitting element, but also with other types of optical neuron elements which transfer an information beam by means of light inputted from the outside such as an optical neuron element according to the first and second embodiments.

Figure 25:
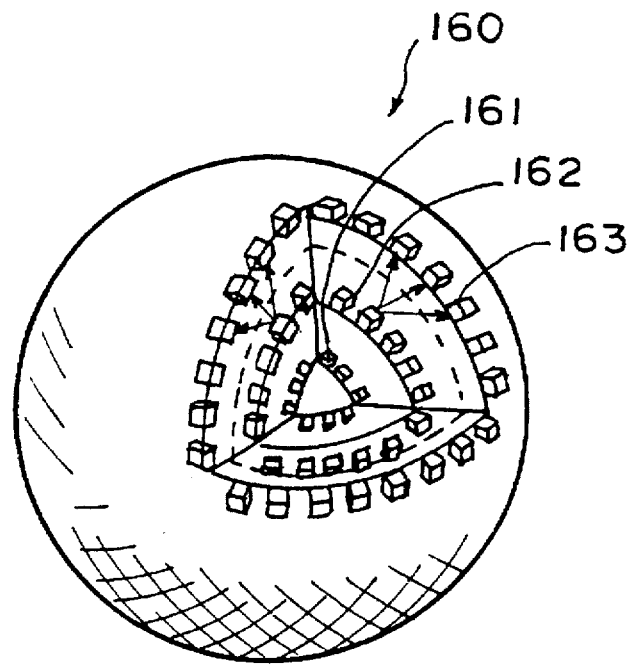
FIG. 25 is a partially enlarged view showing an embodiment of an optical neural network constituted by the connection of a plurality of optical neuron layers made of spherically arranged optical neuron elements according to a second or fourth embodiment of optical computing light emitting element according to this invention.

As illustrated in FIG. 25, an optical neuron layer is constituted by arranging a plurality of optical neuron elements, according to the second or the fourth embodiment of an optical operation light emitting element, and a spherical optical neural network may be constituted by connecting a plurality of these optical neuron layers. As can be seen from FIG. 25, an optical neural network 160 is constituted of three spherical optical neuron layers 161, 162 and 163 connected together. The transfer of an information beam is carried out in the same fashion as in the embodiments previously described, and hence the detailed explanation thereof will be omitted here for brevity.

The optical neural network 160, shown in FIG. 25, may be arranged so that an information beam can travel from an inner optical neuron layer 161 to outer optical neuron layers 162 and 163. Alternately, it may be arranged so that an information beam can travel from the outer optical neuron layer 163 to the inner optical neuron layers 162 and 161.

As mentioned above, an optical neuron layer is constituted by cylindrically or spherically arranging a plurality of optical neuron elements, and an optical neural network is constituted by connecting a plurality of these optical neuron layers. This makes it possible to perform not only data processing in a real space but also data processing in a polar coordinate system.

Figure 26:
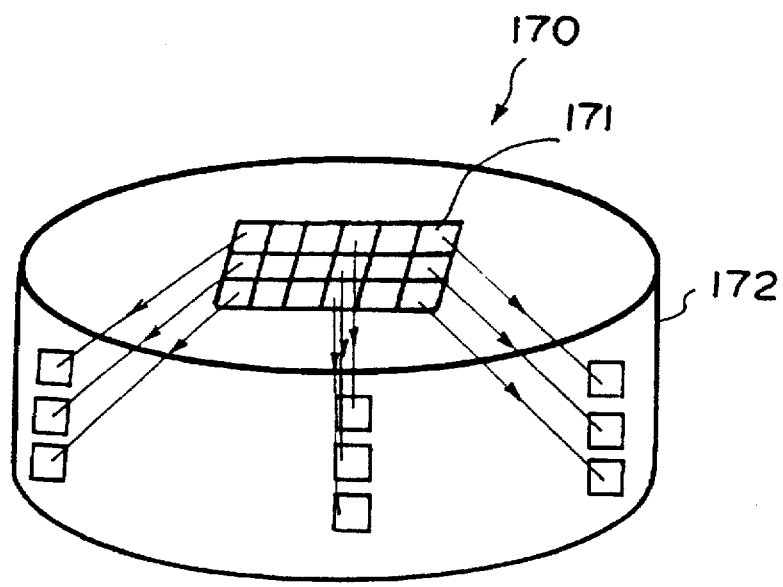
FIG. 26 is a partially enlarged view showing an embodiment of an optical neural network constituted by the combination of an optical neuron layer made of two-dimensionally arranged optical neuron elements according to an embodiment and an optical neuron layer made of the optical elements cylindrically arranged.

As shown in FIG. 26, an optical neural network may be constituted by the combination of an optical neuron layer in which a plurality of optical neuron elements are cylindrically arranged with an optical neuron layer in which a plurality of optical neuron elements are arranged one-dimensionally or two-dimensionally.

As can be seen from FIG. 26, an optical neural network 170 is constituted by connecting an optical neuron layer 172 in which optical neuron elements are cylindrically arranged with an optical neuron layer 171 in which optical neuron elements are two-dimensionally arranged. The transfer of an information beam is carried out in the same manner as the foregoing embodiments, and so the detailed explanation thereof will be omitted here for brevity. In the optical neural network 170 shown in FIG. 26, an information beam travels from an inner optical neuron layer 171 to an outer optical neuron layer 172. However, the network may be arranged so that an information beam can travel from the outer optical neuron layer 172 to the inner optical neuron layer 171.

As described above, it is possible to perform data processing while information in a real space is being converted into a polar coordinate system by connecting a number of optical neuron layers in which a plurality of optical neuron elements are cylindrically or spherically arranged with a number of optical neuron layers in which a plurality of optical neuron elements are arranged one-dimensionally or two-dimensionally.

In the foregoing embodiment, a light signal carrying a positive information beam represented by blue light and a negative information beam represented by red light is separated by a filter means of a light receiving separation element, that is, blue and red filters, and the separated information beams are subjected to an operation. This filter means may be constituted of orthogonal polarizing plates, and positive and negative information beams may be formed into orthogonal polarized information beams. An operation will be executed after these information beams are separated. At this time, the weighting mask should be formed of orthogonal polarizing plates.

In the above embodiment, an explanation was given of an optical neuron element which separates and processes a light signal consisting of positive and negative information beams, the optical neuron element of this invention is not limited to this embodiment, but the optical neuron element may be arranged so that it can separate and process a light signal consisting of a plurality of information beams. In this case, a light receiving separation element of an optical neuron element may be replaced with a light receiving element having a spectral sensitivity characteristic relative to each of the plurality of information beams. Alternatively, the light receiving separation element may be replaced with a plurality of filter means provided with corresponding light receiving elements.

In the above embodiment, an optical neural network is constituted by connecting a plurality of constituent units of an optical neural network. However, when only the foregoing differential processing is executed, there is no need for a plurality of constituent units to be connected together since simply one constituent unit can perform this processing. In this case, the constituent unit of an optical neural network is only one unit, and this one unit constitutes a neural network.

In the above embodiment, an optical neuron layer is constituted by two-dimensionally arranging a plurality of optical neuron elements of each embodiment. An optical neural network is constituted by connecting a plurality of optical neuron layers of each embodiment. However, an optical neural network may be constituted by combining an optical neuron layer of one embodiment with an optical neuron layer of another embodiment.

In the above embodiment, an operation means of an optical neuron element executes a non-linear processing, an addition and a subtraction. However, when the optical neuron element is used as a modulating optical operation element or an optical operation light emitting element, the operation means may be designed to perform multiplication, division, linear processing or a logic operation.

Only two to six optical neuron elements are arranged in the above embodiment, but the number of the elements is not limited to such, and any number of optical neuron elements may be arranged.

An optical data processing circuit, according to this invention, can be applied not only to an optical neural network but also to a circuit which performs various data processing operations.

Embodiment of Photoelectric Operation Element

Figure 27:
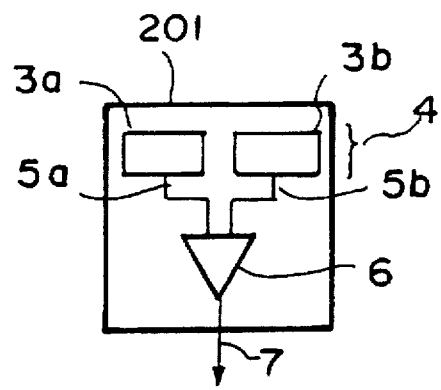
FIG. 27 shows the configuration of an optical operation element according to one embodiment of this invention.

FIG. 27 shows the configuration of a photoelectric operation element according to an embodiment of this invention. As shown in FIG. 27, a photoelectric operation element 201 is made up of:

a light receiving separation element 4 containing a light receiving element 3a, made of a photodiode having a sensitivity characteristic relative to red, for producing an output in the form of an electric signal 5a upon reception of a positive information beam having a red wavelength and a light receiving element 3b, made of a photodiode having a sensitivity characteristic relative to blue, for producing an output in the form of an electric signal 5b upon receipt of a negative information beam having a blue wavelength; and an operation element 6 for outputting an electric signal 7 corresponding to a result of the operation of the electric signals 5a and 5b outputted from the light separation element 4.

Figure 28:
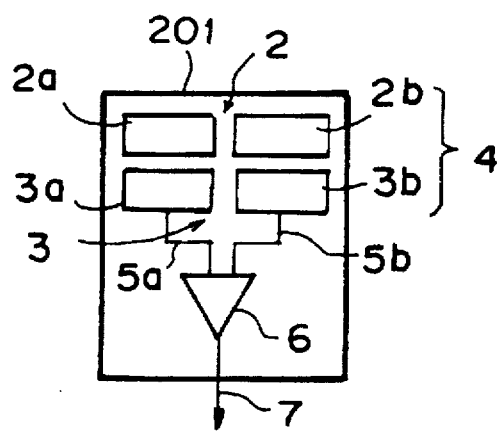
FIG. 28 shows the configuration of an optical operation element according to another embodiment of this invention.

FIG. 28 shows the configuration of another photoelectric operation element according to an embodiment of this invention. As shown in FIG. 28, a photoelectric operation element 201 is made up of:

a light receiving separation element 4 made of
a positive and negative signal separation filter 2 containing a red filter 2a and a blue filter 2b arranged adjacently to each other and
a pair of light receiving elements 3 containing
a light receiving element 3a, made of a photodiode having a sensitivity characteristic relative to red, for producing an output in the form of an electric signal 5a upon receipt of a positive information beam having a red wavelength and
a light receiving element 3b, made of a photodiode having a sensitivity characteristic relative to blue, for producing an output in the form of an electric signal 5b upon receipt of a negative information beam having a blue wavelength; and
an operation element 6 for outputting an electric signal 7 corresponding to a result of the operation of the electric signals 5a and 5b outputted from the light separation element 4.

Figure 29:
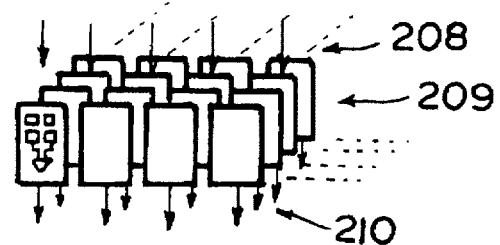
FIG. 29 shows a configuration in which a plurality of photoelectric operation elements, according to an embodiment of this invention, are two-dimensionally arranged in layers.

FIG. 29 shows that a plurality of photoelectric operation elements, according to the above-mentioned embodiments are arranged into a two-dimensional layer pattern. A plurality of the photoelectric operation elements shown in FIGS. 27 and 28 are arranged in a two-dimensional layer pattern with their light receiving separation element side facing to the direction of input of an information beam, thereby constituting a photoelectric operation element layer 209. In the photoelectric operation element layer 209, a plurality of two dimensional information beams 208 are received in parallel, and the separation of the information beams and an operation among the plurality of information beams are carried out inside each discrete element. A two-dimensional electric signal 210 is outputted in parallel as a result of this operation.

The photoelectric operation element layer 209 having such a configuration is applied to an embodiment shown below.

An embodiment of this invention in which this photoelectric operation element layer 209 having the foregoing structure is applied to the pre-processing of image processing will now be described in detail.

Figure 30:
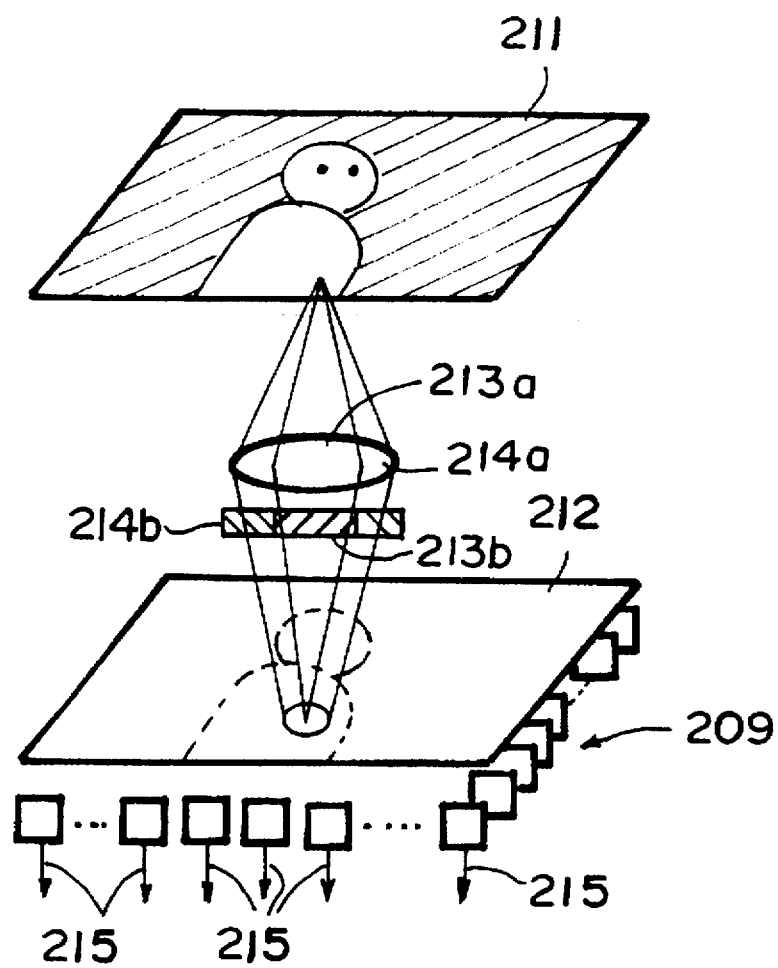
FIG. 30 shows the arrangement of a photoelectric operation element layer for enhancing edges according to an embodiment of this invention.
Figure 31:
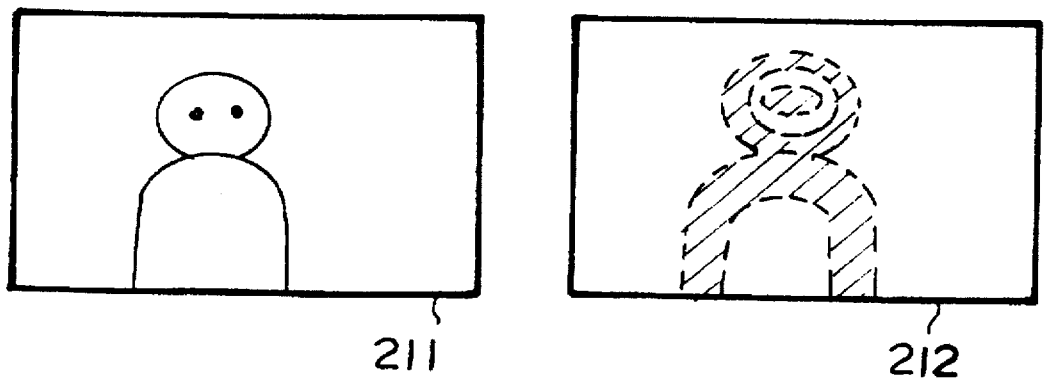
FIG. 31 shows image data.

FIG. 30 shows an arrangement in which the edge enhancement of an input image, which is one of the basic image processing operations, is carried out by a photoelectric operation element layer according to this embodiment of this invention. In this embodiment, an information beam which the photoelectric operation element layer 209 receives is made of a pair of positive and negative information beams. As shown in FIG. 31, a positive information beam in itself is a two-dimensional image data 211. Meanwhile, negative information is image data 212 made by subjecting a two-dimensional image to be processed to a slight spatial gradation processing or image data from which only high-frequency components are eliminated. The image data 211 is inputted into the photoelectric operation layer 209 by way of the center 213a of an imaging lens provided with a red filter 213b. The image data 212 is inputted into the photoelectric operation element layer 209 via the periphery 214a of the imaging lens provided with a blue filter 214b. Now, the slight gradation processing to which the image data 211 is subjected can be easily carried out by the utilization of a lower imaging characteristic of the periphery of the imaging lens, the defocusing of a lens or an aberration.

The photoelectric operation element layer 209 separates the positive and negative information 211 and 212 by means of a red filter and a blue filter provided in each element. A pair of light receiving elements of each photoelectric operation element designated for positive and negative information receive each information beam, and outputs from the pair of the light receiving elements are subjected to an operation. A two-dimensional electric signal 215 corresponding to an operation result is then outputted in parallel. In this embodiment, the multiplication of the positive and negative signals by a constant value and the subtraction of results of this multiplication are performed inside the light receiving element.

Figure 32A:
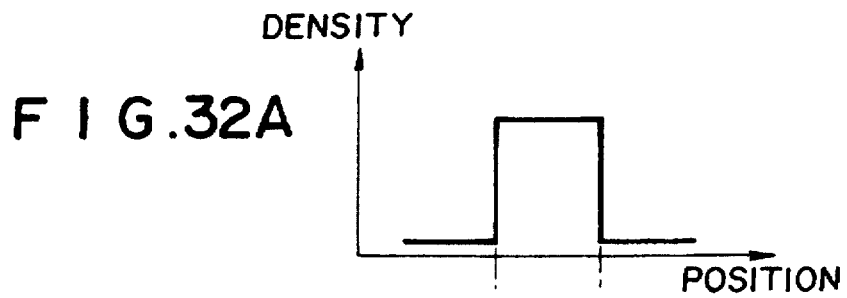
FIGS. 32A to 32C show a distribution of density of an image to be processed.
Figure 32B:
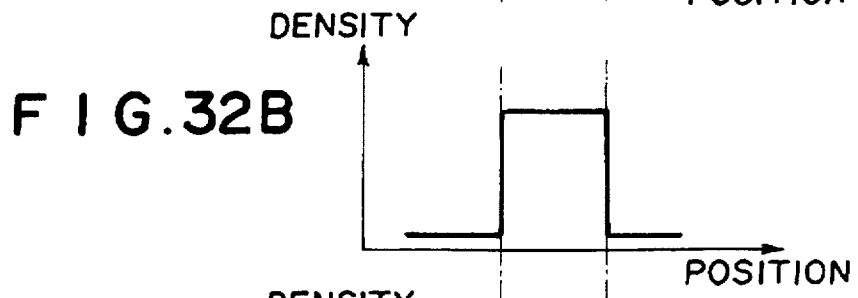
Figure 32C:
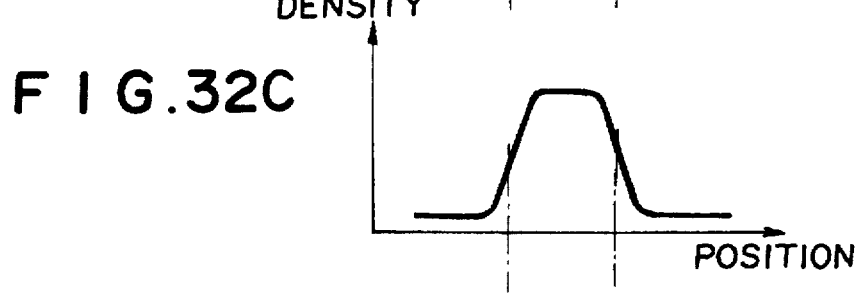

The principle of the edge enhancement of the two-dimensional image data 211 to be processed by the foregoing arrangement will now be described further in detail. FIGS. 32 and 33 show the density cross section of an image to be processed. For simplicity, there is used a plot of a one-dimensional density distribution profile diagram with the axis of ordinates representing the density of an image and the axis of abscissas representing a one-dimensional cross section of one part of the image. In FIGS. 32 and 33, dashed lines of waveforms show the relative position of the waveforms. FIG. 32A shows an example of a density distribution of an image to be processed. FIG. 32B shows a one-dimensional light intensity distribution of an information beam to be inputted into the photoelectric operation element layer 209 in the form of an image via the center 213a of the imaging lens provided with the red filter 213b. FIG. 32C shows a one-dimensional light intensity distribution of an information beam to be inputted into the photoelectric operation layer 209 via the periphery 214a of the imaging lens provided with the blue filter 214b. This light intensity distribution is slightly spatially gradated when compared with the density distribution shown in FIG. 32A utilizing a lower imaging characteristic of the periphery of the imaging lens, the defocusing of a lens or an aberration.

When the information beam having the intensity distribution of a pair of red and blue light beam enters the photoelectric operation element layer 209, the information beam is separated into a positive information beam and a negative information beam by means of a red and a blue filter disposed in each element of the photoelectric operation element layer. The separated information beams are received by a pair of light receiving elements, respectively, and then outputted from the pair of light receiving elements. The intensity distribution of the outputted positive and negative information beams is similar to the distributions shown in FIGS. 32B and 32C.

Figure 33A:
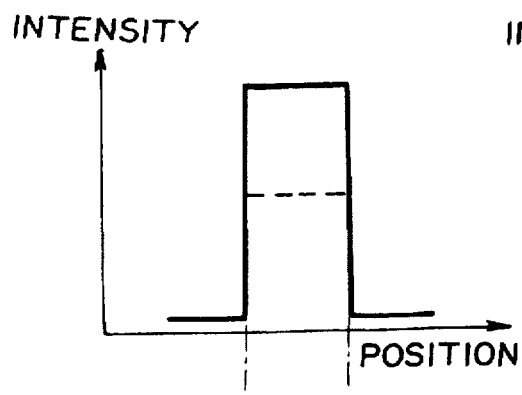
FIGS. 33A to 33C show a distribution of intensity of an image to be processed.
Figure 33B:
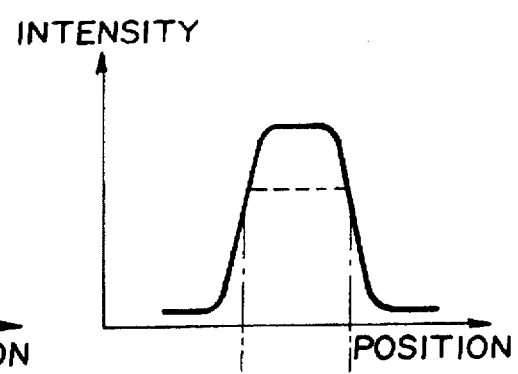

Thereafter, the multiplication of the positive and negative signals outputted from the pair of the light receiving elements by a constant value is executed in each photoelectric operation element as a first operation. The multiplication of the positive and negative signals by a positive constant value leads to amplified signals. However, in the case of edge enhancing processing, an amplification factor of the positive signal should be set larger than that of the negative signal. FIG. 33A shows a result obtained when the positive signal was amplified twice, and the negative signal was amplified one half times.

Figure 33C:
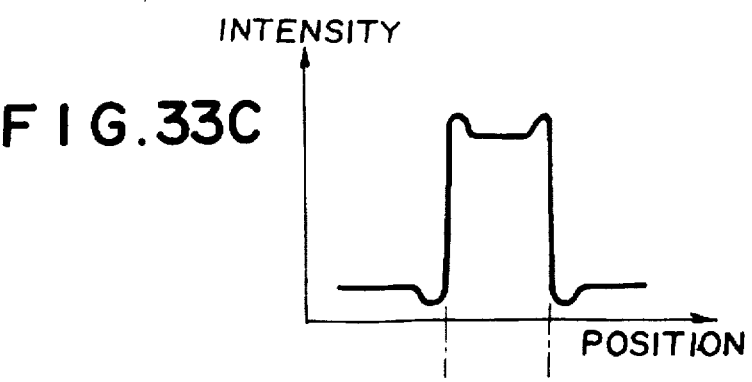

As a second operation of each photoelectric operation element 209, the subtraction of an amplified negative signal from an amplified positive signal is executed. FIG. 33C shows an intensity distribution of a result obtained by subtracting the amplified negative signal shown in FIG. 33B from the amplified positive signal shown in FIG. 33A. When compared with an original image to be processed shown in FIG. 32A, it will be noted that the density distribution around the edges of the image are enhanced to a much greater extent.

An explanation will now be given of an embodiment of this invention in which the photoelectric operation element layer 209 is applied to the elimination of shadings from one-dimensional or two-dimensional spatial information. The shadings used herein represent undulations of the intensity of the entire signal resulting from variations in sensitivity of a detector in the case of signal detection.

Figure 34:
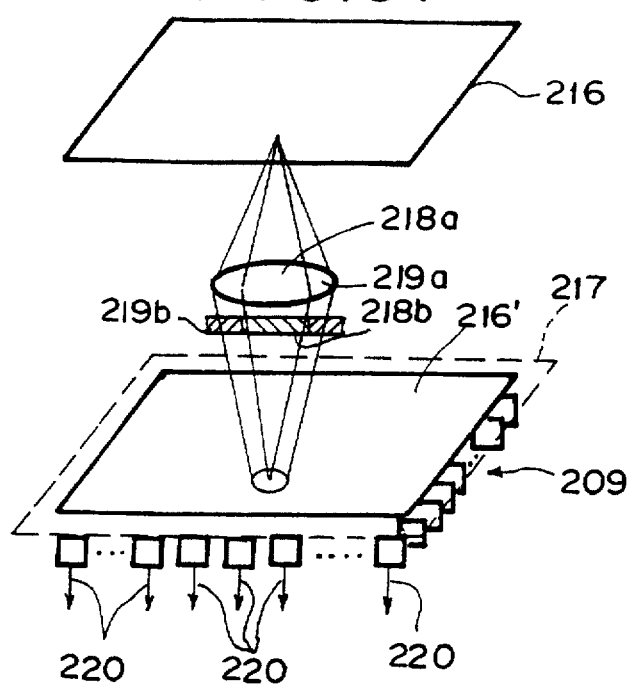
FIG. 34 shows the arrangement of a photoelectric operation element layer for eliminating undulations from a signal according to an embodiment of this invention.

FIG. 34 shows an arrangement in which shadings are eliminated from two-dimensional spatial information by means of a photoelectric operation element layer of this invention. In this embodiment, an information beam which the photoelectric operation element layer 209 receives is made of a pair of positive and negative information beams. A positive information beam in itself contains two-dimensional image data 216. Meanwhile, a negative information contains image data 217 made by subjecting a two-dimensional image to be processed to considerable spatial gradation processing or image data from which only low-frequency components are sampled. The image data 216 is inputted into the photoelectric operation layer 209 as spatial information 216' by way of the center 218a of an imaging lens provided with a red filter 218b. The image data 217 is inputted into the photoelectric operation element layer 209 via the periphery 219a of the imaging lens provided with a blue filter 219b. Now, the considerable gradation processing to which the image data 211 is subjected can be easily carried out by the utilization of a lower imaging characteristic of the periphery of the imaging lens, the defocusing of a lens or an aberration.

The photoelectric operation element layer 209 separates the positive and negative information 216' and 217' by means of a red filter and a blue filter provided in each element. A pair of light receiving elements of each photoelectric operation element designated for positive and negative information receive each information beam, and outputs from the pair of light receiving elements are subjected to an operation. A two-dimensional electric signal 220 corresponding to an operation result is then outputted in parallel. In this embodiment, the multiplication of the positive and negative signals by a constant value, the subtraction of results of this multiplication, and the addition of a constant value to a result of the subtraction are performed inside the light receiving element.

Figure 35A:
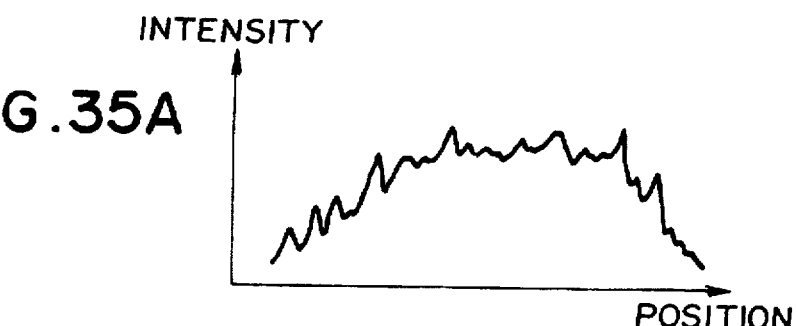
FIGS. 35A to 35C show a profile of intensity of spatial information to be processed.
Figure 35B:
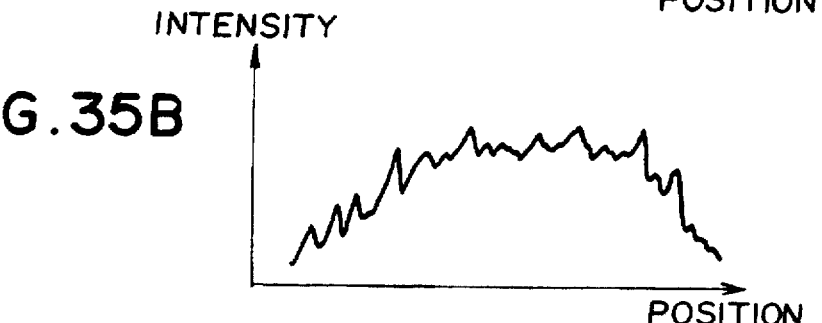
Figure 35C:
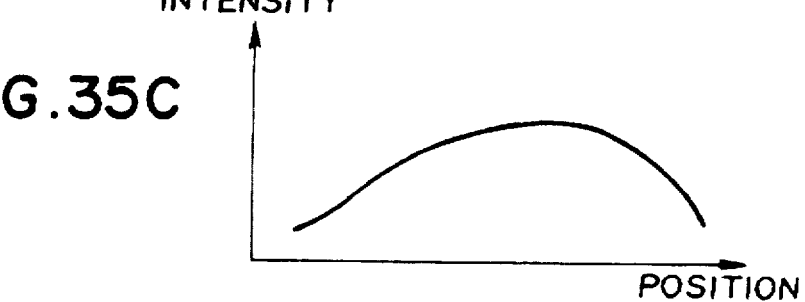

The principle of the elimination of shadings from the two-dimensional image data 216 to be processed by the foregoing arrangement will now be described in further detail. FIGS. 35, 36 and 37 show the intensity cross section of a spatial information to be processed. For simplicity, a plot of a one-dimensional intensity distribution profile diagram are used with the axis of ordinates representing the intensity of a spatial information and the axis of abscissas representing a one-dimensional cross section of the spatial information. FIG. 35A shows an example of an intensity distribution of an image to be processed. FIG. 35B shows a one-dimensional light intensity distribution of an information beam to be inputted into the photoelectric operation element layer 209 in the form of an image via the center 218a of the imaging lens provided with the red filter 218b. FIG. 35C shows a one-dimensional light intensity distribution of an information beam to be inputted into the photoelectric operation layer 209 via the periphery 219a of the imaging lens provided with the blue filter 219b. This light intensity distribution is considerably spatially gradated when compared with the intensity distribution shown in FIG. 35A utilizing a lower imaging characteristic of the periphery of the imaging lens, the defocusing of a lens or an aberration.

When the information beam having the intensity distribution of a pair of red and blue light beams enters the photoelectric operation element layer 209, the information beam is separated into a positive information beam and a negative information beam by means of a red and a blue filter disposed in each element of the photoelectric operation element layer. The separated information beams are received by a pair of light receiving elements, respectively, and then outputted from the pair of light receiving elements. The intensity distribution of the outputted positive and negative information beams is similar to the distributions shown in FIGS. 35B and 35C.

Figure 36A:
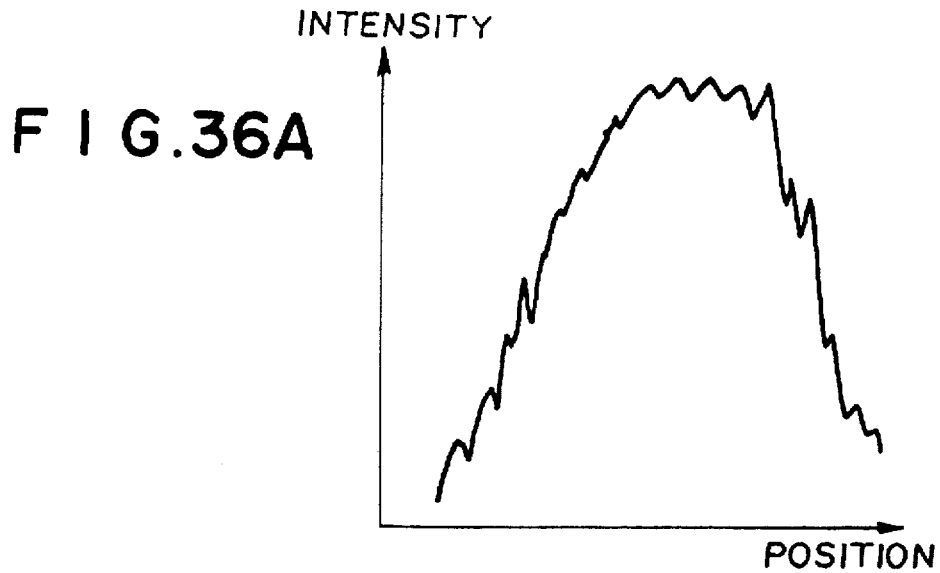
FIGS. 36A and 36B show a profile of intensity of spatial information to be processed.
Figure 36B:
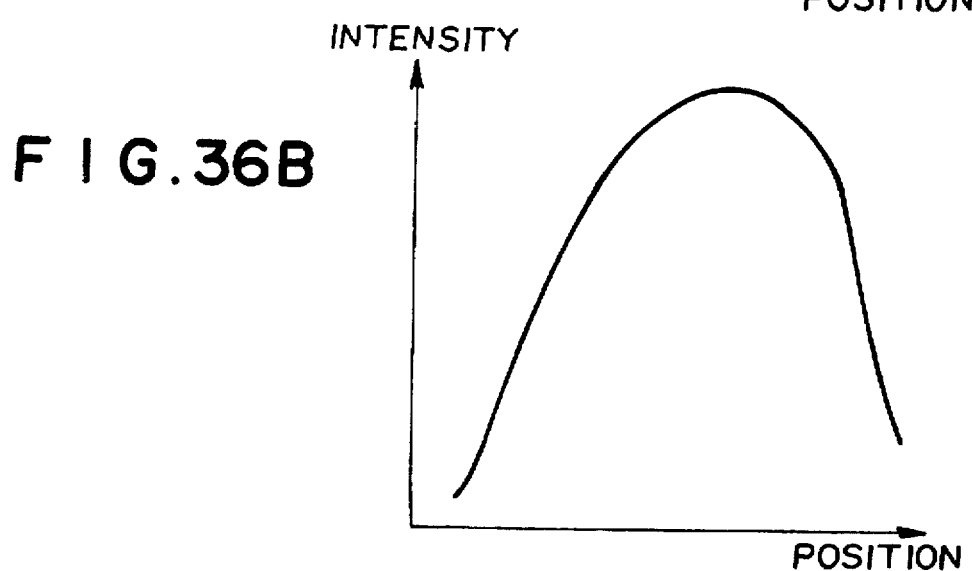

Thereafter, the multiplication of the positive and negative signals outputted from the pair of the light receiving elements by a constant value is executed in each photoelectric operation element as a first operation. The multiplication of the positive and negative signals by a positive constant value leads to amplified signals. However, in the case of a shading elimination processing, an amplification factor of the positive signal should be equal to that of the negative signal. FIGS. 36A and 36B show results obtained when both the positive and negative signals are amplified three times.

Figure 37A:
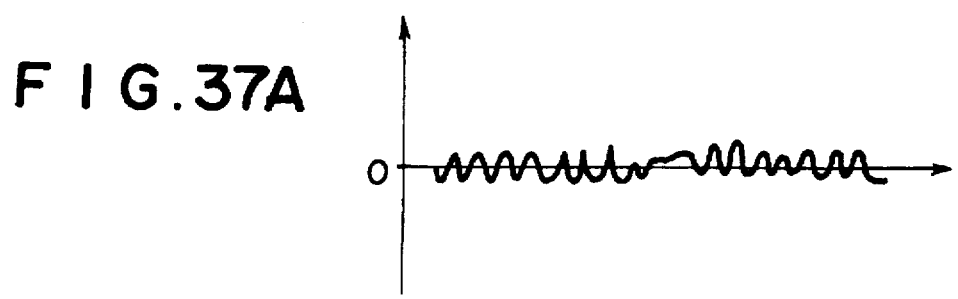
FIGS. 37A and 37B are diagrams showing a signal without shadings.

As a second operation of each photoelectric operation element 209, the subtraction of an amplified negative signal from an amplified positive signal is executed. FIG. 37A shows an intensity distribution of a result obtained by subtracting the amplified negative signal from the amplified positive signal shown in FIGS. 36A and 36B.

Figure 37B:
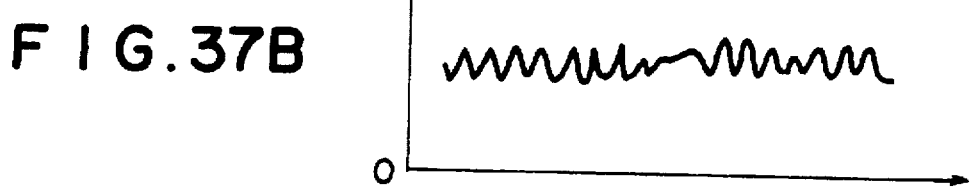

As a third operation, the addition of a constant value to a result of the subtraction is carried out. The addition of this constant value corresponds to the application of a bias. A value of this constant should be set to any appropriate value which produces a positive value anytime after the constant value is added to a result of the subtraction. FIG. 37B shows an intensity distribution of a result obtained by the addition of a constant value to a result of the subtraction. When compared with an original spatial information to be processed shown in FIG. 35A, it will be noted that shadings are eliminated from the information.

An embodiment of this invention in which the photoelectric operation element layer 209 is applied to the sampling of a moving object will now be described in detail.

Figure 38:
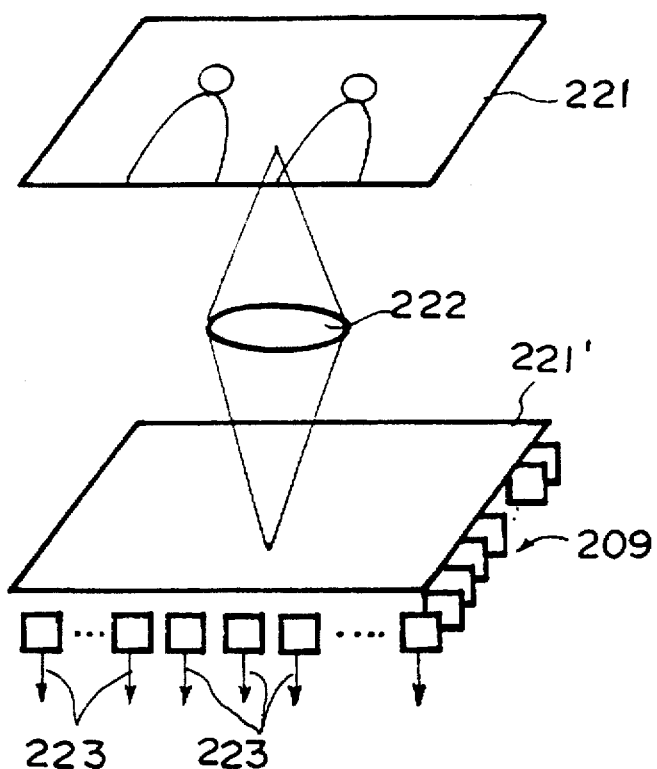
FIG. 38 is a structure for extracting a moving object by means of a photoelectric operation layer according to an embodiment of this invention.

FIG. 38 shows an arrangement in which the sampling of a moving object is carried out by means of a photoelectric operation element layer of this invention. In this embodiment, an information beam which the photoelectric operation element layer 209 receives is a two-dimensional image data 221 which varies with time. The image data 221 is inputted into the photoelectric operation element layer 209 as image data 221' in the form of a two-dimensional image beam by means of an imaging lens 222.

A pair of light receiving elements 3a and 3b of each element receives the information beam in the photoelectric operation element layer 209. Signals 5a and 5b outputted from the pair of light receiving elements are subjected to an operation, and a two-dimensional electric signal 223 corresponding to an operation result is then outputted in parallel. In this embodiment, the delayed operation of the signal 5b and the subtraction of the signal 5a from the signal 5b which was subjected to a delayed operation are carried out in the light receiving element.

Figure 39A:
FIGS. 39A and 39B show a profile of density of an image to be processed.
Figure 39B:
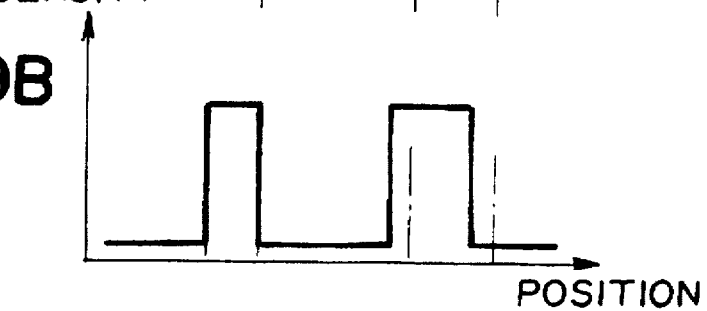
Figure 40A:
FIGS. 40A to 40C show a profile of intensity of an image to be processed.
Figure 40B:

The principle of the sampling of a moving object from a two-dimensional image data 221 to be processed which varies with time will now be described in further detail. FIGS. 39 and 40 show the density cross section of an image to be processed. In FIGS. 39 and 40, dashed lines on the waveforms show the relative position of the waveforms. For simplicity, a plot of a one-dimensional density distribution profile diagram is used with the axis of ordinates representing the density of an image and the axis of abscissas representing a one-dimensional cross section of the image. FIG. 39A shows an example of the density distribution of an image to be processed at a certain time (t). FIG. 39B shows a density distribution at a time (t+α) when a nominal time has elapsed from a certain time "t". This embodiment shows a situation in which only a right-side object of two bright objects positioned at the center made a slight movement from right to left during a period between a time (t) and a time (t+α).

When information beams having a light intensity distribution which varies from a time (t) to a time (t+α) are successively inputted into the photoelectric operation element layer 209, the pair of light receiving elements of each element of the photoelectric operation element layer successively receives light signals. Electric signals are then consequently outputted from the pair of light receiving elements. As with the distributions shown in FIGS. 39A and 39B, the intensity distribution of these outputs represent the movement of an object during a period between a time (t) and a time (t+α).

In each photoelectric operation element, the delayed operation of a signal outputted from the light receiving element 3b which is one of the pair of light emitting elements is carried out as a first operation. Here, the delayed operation used herein this specification is an operation for providing a delay for a constant period to an electric signal outputted from the light receiving element 3b at a time (t). In order to execute a delayed operation, an analog electric circuit having a response time delay or a digital circuit having a buffer for retaining data may be utilized.

Figure 40C:
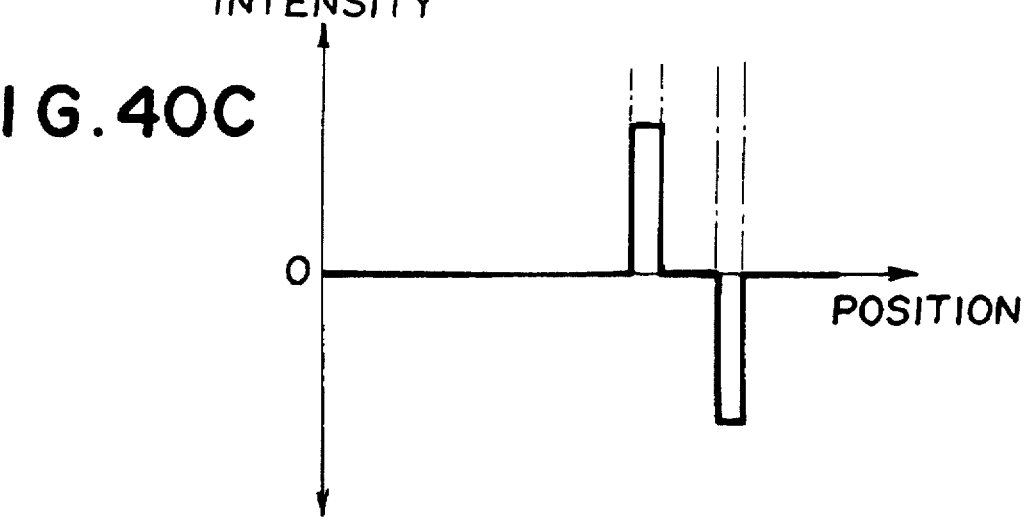

As a second operation, the subtraction of two electric signals thus obtained having a time difference of α is executed. FIG. 40C shows the intensity distribution of a result of the subtraction of these two signals. From this intensity distribution, it is possible to easily know the presence of a moving object, and also to sample it.

It is also possible to digitally sample such a moving object using an electronic computer. However, the electronic computer processes image data pixel by pixel, so that it takes a very long time to process. Particularly, in the case of the sampling of a moving object where data processing varies with time, a satisfying processing speed is rarely obtained even when a significantly high speed electronic computer is used. In the foregoing embodiment, processing for one pixel is executed by one photoelectric operation element. Hence, if the size of an image to be processed (the number of pixels) is increased, a processing speed is, in principle, almost the same as that of one photoelectric operation element, whereby it is possible to attain a remarkably high processing speed overall. Moreover, there is a parallel computer which has a plurality of processors, but this type of parallel computer suffers from a problem that the processing of each operation element must be kept in phase with those of other elements in order to effectively perform the entire parallel processing. In the above embodiment, since the operation of each photoelectric operation element is out of phase with other elements, there is no need to keep the elements in phase with each other. In other words, if there are somewhat variations in the processing speed of each element, these variations do not affect an overall operation result at all.

An embodiment of this invention in which the photoelectric operation element layer 209 is applied to a pattern logic will now be described.

Figure 41:
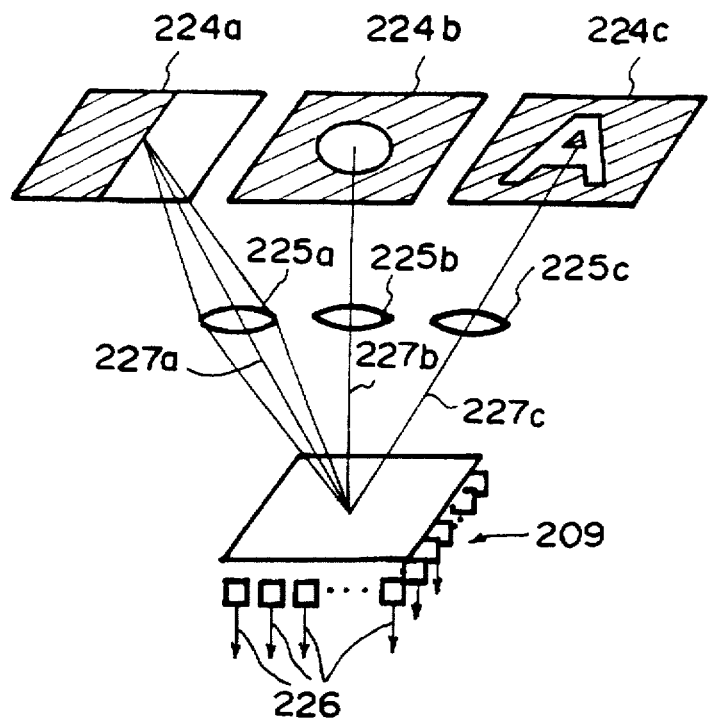
FIG. 41 shows the arrangement of photoelectric operation element layer for implementing a pattern logic according to an embodiment of this invention.

FIG. 41 shows an arrangement in which a pattern logic is implemented by means of a photoelectric operation element layer according to this embodiment. In this embodiment, the photoelectric operation element layer 209 receives a plurality of beams of a two-dimensional binary pattern data, that is, two-dimensional pattern data 242a, 242b and 242c. The two-dimensional binary pattern data are inputted into the photoelectric operation element layer 209 as two-dimensional optical pattern data via imaging lenses 252a, 252b and 252c.

A number of light receiving elements of each photoelectric element of the photoelectric element layer 209 receive information light, and outputs of the light receiving elements are subjected to an operation, as a result of which a two-dimensional electric signal 226 corresponding to an operation result is outputted in parallel. In this embodiment, the operation executed in the light receiving elements is a multi-input/one-output logic operation.

The principle by which a result of the pattern logic can be outputted from the plurality of two-dimensional pattern data 242a, 242b and 242c to be processed will now be described in further detail.

Figure 42A:
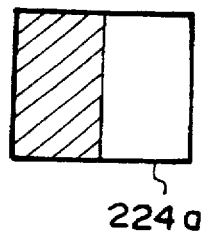
FIGS. 42A to 42C show a two-dimensional data of an image to be processed in the form of a binary pattern.
Figure 42B:
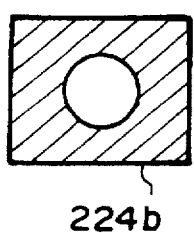
Figure 42C:
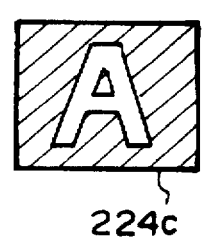
Figure 43:
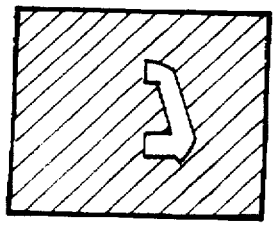
FIG. 43 shows a two-dimensional data of a processed image in the form of a binary pattern.

FIGS. 42 and 43 show a binary pattern of a two-dimensional pattern to be processed. A white region in the drawing is represented by zero and a shaded region is represented by one. An explanation will be given of a case where three types of pattern data are handled as a number of input patterns. These three types of pattern data beams are concurrently inputted into the photoelectric operation element layer 209 in the form of light having a different wavelength, that is, a red light signal 227a, a green light signal 227b and a blue light signal 227c.

In the photoelectric operation element layer 209, a red filter, a green filter and a blue filter disposed in each operation element separate the three types of information beam 227a, 227b and 227c, and a group of light receiving elements of each operation element designated for three types of data receive each information beam, and outputs from the group of light receiving elements are subjected to an operation. Then, a two-dimensional electric signal 226 corresponding to an operation result is outputted in parallel. In this embodiment, the operation executed in the light receiving elements is a three-input/one-output logic operation which needs three types of input signals. More concretely, this operation is a three-input-AND operation wherein one is outputted only when three types of input signals are one, and if any of the input signals is not one, zero is outputted. It will be realized that this three-input-AND operation is executed when three types of input patterns are compared with FIGS. 42A, 42B and 42C.

The aforementioned optical neuron element can be constituted by the combination of the above-mentioned photoelectric operation element with a light modulation element. The foregoing optical neuron layer is constituted by arranging a plurality of these optical neuron elements in a one-dimensional or a two-dimensional pattern. It is also possible to constitute an optical neural network by connecting a plurality of these optical neuron layers.

Figure 44:
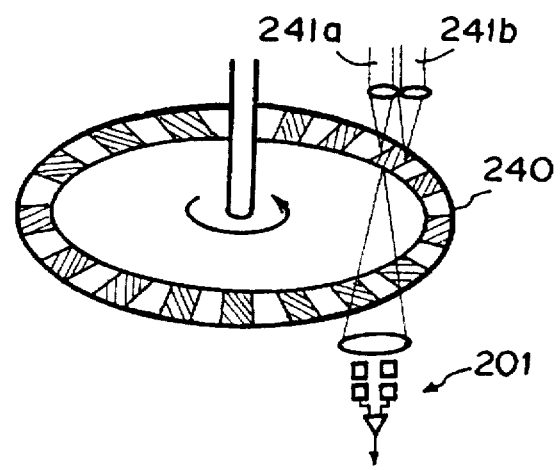
FIG. 44 shows an arrangement for carrying out the detection of a rotary encoder by means of a photoelectric operation element layer according to an embodiment of this invention.

The photoelectric operation element, according to this invention, can be used alone unless a plurality of the elements are arranged in a layer. For instance, this photoelectric operation element may be used as a detecting element of a rotary encoder. FIG. 44 shows an arrangement in which the photoelectric operation element, according to the embodiments of this invention, performs the detection of a rotary encoder. In this case, two information beams fall on a grid of a rotating encoder at a nominal spacing, and they are reflected from, or pass through, the grid in the form of two pulse beams. When a difference between these two pulse beams is calculated, a result of this calculation indicates a direction of movement of an object.

Figure 45A:
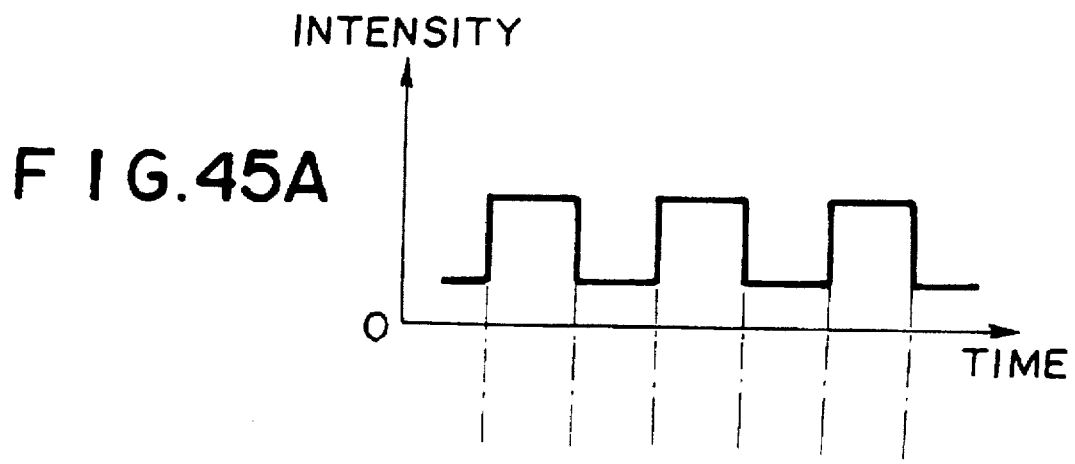
FIGS. 45A to 45C show two pulse beams.
Figure 45B:
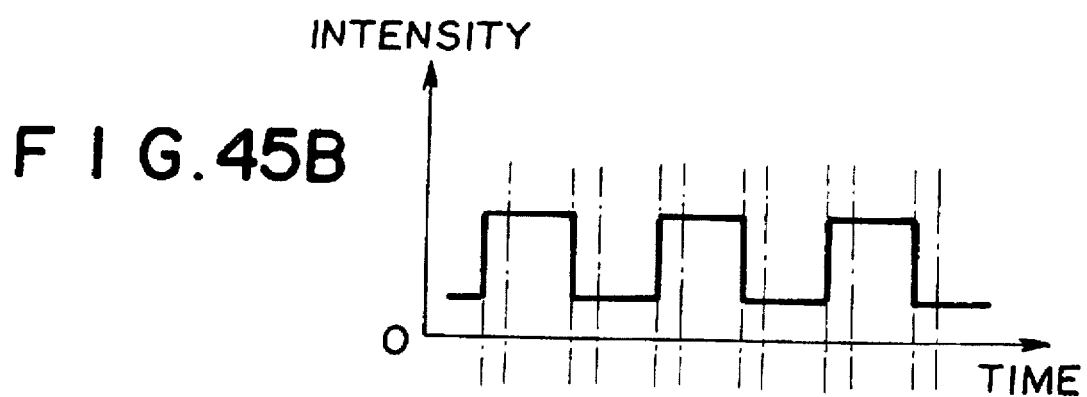

The principle by which a direction of movement of an object can be detected by two pulse beams 241a and 241b which are reflected from, or pass through, a grid 240 after they have fallen on the rotating grid 240 at a nominal spacing will now be described in further detail. FIGS. 45A and 45B are graphs showing two pulse beams, and the longitudinal axis of the graph represents the intensity of a pulse beam, while the lateral axis represents time. In FIGS. 45, dashed lines show the relative timing of pulses. The radiation and reflection or transmission of these two pulse beams are carried out with a nominal spacing between them, a signal shown in FIG. 45A and a signal shown in FIG. 45B are therefore slightly different from each other in timing.

When these pulse information beams are successively inputted into the photoelectric operation element layer 209, a pair of light receiving elements of each photoelectric operation element of the photoelectric operation element layer receives the information beams, and an electric signal is outputted from the pair of light receiving elements. This output is similar to those shown in FIGS. 45A and 45B.

Figure 45C:
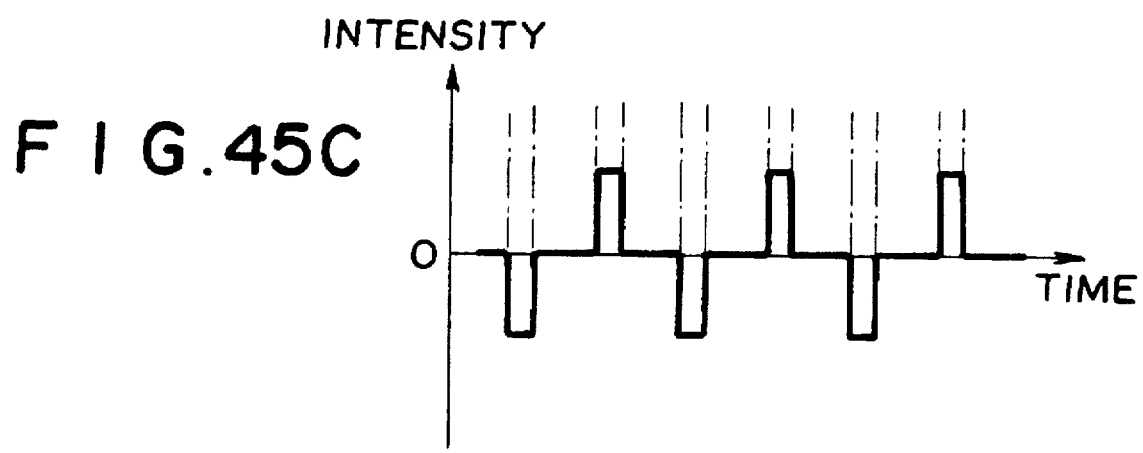
Figure 46:
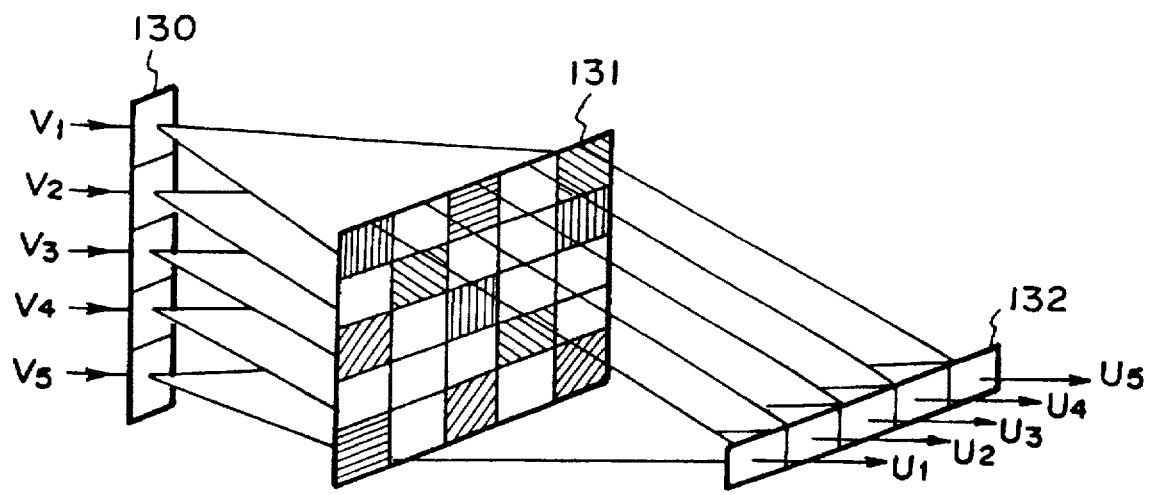
FIG. 46 shows another model of an optical neural computer.
Figure 47:
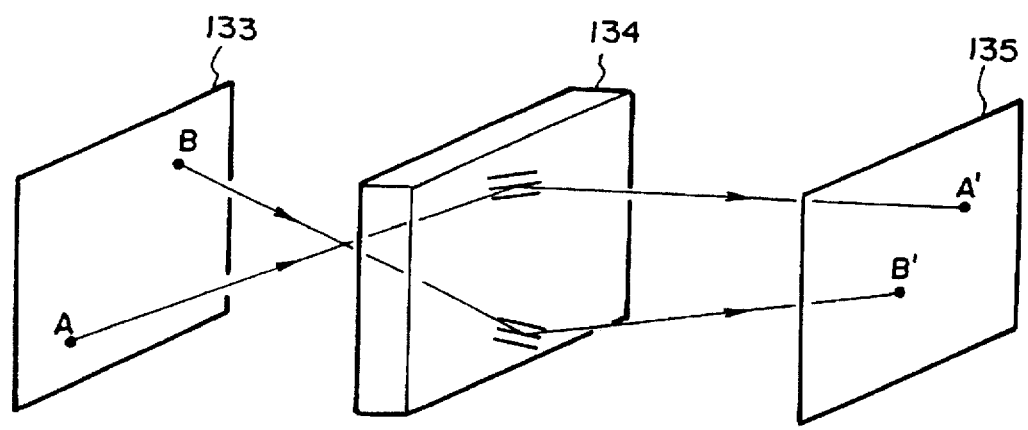
FIG. 47 shows another model of an optical neural computer.

The subtraction of two electric signals is carried out in each photoelectric operation element. FIG. 45C shows a result of the subtraction of these two signals. From this result, it is possible to know a direction of rotation of a rotary encoder from whether a sign of the operation result obtained when an electric signal rises is positive or negative.

It will be understood that the above description of the present invention is susceptible to various modifications, changes and adaptations and the same are intended to be comprehended within the meaning and range of equivalents of the appended claims.

What is claimed is:

1. A modulating optical operation element comprising:
   a photoelectric operation element having
   (a) a light receiving separation element including at least two adjacently arranged optical filter means for simultaneously receiving and separating the input information beam into individual information beams and a plurality of light receiving elements which simultaneously receive said individual information beams and output separated electrical information signals which are independent of each other; and
   (b) an operation element which outputs a resulting electric signal corresponding to an operation result obtained by subjecting said separated electrical information signals to an operation; and
   a light modulation element which modulates light by changing a transmissivity or a reflection characteristic thereof with respect to light in response to said resulting electric signal.

2. A modulating optical operation element as defined in claim 1, wherein said light receiving separation element simultaneously receives and separates an input information beam containing positive and negative information and outputs separated electrical information signals which are independent of each other.

3. A constituent unit of an optical data processing circuit comprising:
   a plurality of modulating optical operation elements; each modulating optical operation element having
   a photoelectric operation element including
   (a) a light receiving separation element including at least two adjacently arranged optical filter means for simultaneously receiving and separating the input information beam into individual information beams and a plurality of light receiving elements which simultaneously receive said individual information beams and output separated electrical information signals which are independent of each other, and (b) an operation element which outputs a resulting electric signal corresponding to an operation result obtained by subjecting said separated electrical information signals to an operation, and a light modulation element which modulates light by changing a transmissivity or a reflection characteristic thereof with respect to light in response to said resulting electric signal; said plurality of modulating optical operation elements being arranged one-dimensionally or two-dimensionally and generating a modulated information beam consisting of a beam outputted from each modulating optical operation element.

4. A constituent unit of an optical data processing circuit as defined in claim 3, further comprising:

a weighted information beam output means for weighing a modulated information beam outputted from said plurality of modulating optical operation elements which outputs a weighted information beam.

5. A constituent unit of an optical data processing circuit as defined in claim 4, wherein said weighted information beam output means weighs a modulated information beam outputted from a first group of modulating optical operation elements of said plurality of modulating optical operation element and outputs a weighted information beam;

wherein a second group of modulating optical operation elements of said plurality of modulating optical operation elements receives, as an input, the weighted information beam outputted from said weighted information beam output means and produces an output by modulating said information beam;

said constituent unit further comprising an information beam re-input means for inputting a modulated information beam outputted from said second group of modulating optical operation elements to said first group of modulating optical operation elements again.

6. An optical data processing circuit comprising:

a plurality of constituent units of an optical data processing circuit, each constituent unit having a plurality of modulating optical operation elements; each modulating optical operation element having a photoelectric operation element having (a) a light receiving separation element including at least two adjacently arranged optical filter means for simultaneously receiving and separating the input information beam into individual information beams and a plurality of light receiving elements which simultaneously receive said individual information beam and output separated electrical information signals which are independent of each other, and (b) an operation element which outputs a resulting electric signal corresponding to an operation result obtained by subjecting said separated electrical information signals to an operation, and a light modulation element which modulates light by changing a transmissivity or a reflection characteristic thereof with respect to light in response to said resulting electric signal; said plurality of modulating optical operation elements being arranged one-dimensionally or two-dimensionally and generating a modulated information beam consisting of a beam outputted from each modulating optical operation element; and each constituent unit also including a weighted information beam output means for weighing the modulated information beam outputted from said plurality of modulating optical operation elements and outputting a weighted information beam; said plurality of constituent units being connected to each other in such a manner that an information beam outputted from one constituent unit of said plurality of constituent units enters another constituent unit, one after another.

7. An optical data processing circuit as defined in claim 6, wherein includes a plurality of one or two-dimensionally arranged modulating optical operation elements, including a first and a second group of modulating optical operation elements; each modulating optical operation element having a photoelectric operation element having (a) a light receiving separation element including at least two adjacently arranged optical filter means for simultaneously receiving and separating the input information beam into individual information beams and a plurality of light receiving elements which simultaneously receive said individual information beam and output separated electrical information signals which are independent of each other, and (b) an operation element which outputs a resulting electric signal corresponding to an operation result obtained by subjecting said separated electrical information signals to an operation, and a light modulation element which modulates light by changing a transmissivity or a reflection characteristic thereof with respect to light in response to said resulting electric signal; and said constituent unit also includes a weighted information beam output means for weighing a modulated information beam outputted from the first group of modulating optical operation elements and outputting a weighted information beam to said second group of modulating optical operation elements, said second group producing an output by modulating said weighted information beam; and an information beam re-input means for inputting the modulated information beam outputted from said second group of modulating optical operation elements to said first group of modulating optical operation elements again.

8. A photoelectric operation element which converts an input optical signal into an electric signal, and produces an output by computing said electric signal comprising:

a light receiving separation element including at least two adjacently arranged optical filter means for simultaneously receiving and separating the input information beam into individual information beams and a plurality of light receiving elements which simultaneously receive said individual information beams and outputs separated electrical information signals which are independent of each other; and an operation element which outputs an electric signal in response to an operation result obtained by processing said separated electrical information signals outputted from said light receiving separation element.

9. A photoelectric operation element layer comprising:

a plurality of photoelectric operation elements; each photoelectric operation element having (a) a light receiving separation element including a plurality of light receiving elements and a plurality of adjacently arranged optical filter means for simultaneously receiving an input information beam and separating said input information beam into individual information beams, said light receiving elements receiving said individual information beams and outputting separated electrical information signals which are independent of each other; and (b) an operation element which outputs an electric signal corresponding to an operation result obtained by computing said separated electrical information signals outputted from said light receiving separation element; said plurality of photoelectric operation elements being arranged one-dimensionally or two-dimensionally.

10. A photoelectric operation element which converts an inputted optical signal into an electric signal, and produces an output by computing said electric signal, said photoelectric operation element comprising:

a light receiving separation element including (a) a pair of light receiving separation elements, arranged adjacently to each other, which simultaneously receive and optically filter an input information beam containing positive and negative information and separate said input information beam into separated electrical information signals which are independent of each other; and (b) an operation element which outputs an electric signal corresponding to an operation result obtained by computing said separated electrical information signals.

11. A photoelectric operation element layer comprising:

a plurality of photoelectric operation elements, each photoelectric operation element having (a) a light receiving separation element including a pair of light receiving separation elements, arranged adjacently to each other, which simultaneously receive and optically filter an input information beam containing positive and negative information and separate said input information beam into separated electrical information signals which are independent of each other; and (b) an operation element which outputs an electric signal corresponding to an operation result obtained by computing said separated electrical information signals, which are arranged one-dimensionally or two-dimensionally.

12. A photoelectric operation element layer as defined in claim 11, wherein said plurality of photoelectric elements are arranged one-dimensionally or two-dimensionally.

13. A photoelectric operation element which converts an input optical signal into an electric signal, and produces an output by computing said electric signal, said photoelectric operation element comprising:

a light receiving separation element, including a pair of adjacently arranged optical filter means for simultaneously receiving an input information beam, containing positive and negative information and separating said input information beam into individual information beams and outputting separated electrical information signals which are independent of each other; and an operation element which outputs an electric signal corresponding to an operation result obtained by computing said separated electrical signals outputted from said light receiving separation element; said photoelectric operation element being capable of receiving an input information beam from two directions.

14. A photoelectric operation element layer comprising:

a plurality of photoelectric operation elements, each having a light receiving separation element, including a pair of adjacently arranged optical filter means for receiving and simultaneously separating an information beam containing positive and negative information into individual information beams and outputting separated electrical information signals which are independent of each other; and an operation element which outputs an electric signal corresponding to an operation result obtained by computing said separated electrical signals outputted from said light receiving separation element; said plurality of photoelectric operation elements being capable of receiving an input information beam from two different directions.

* * * * *